United States Patent
Wu

(10) Patent No.: US 12,089,087 B2
(45) Date of Patent: Sep. 10, 2024

(54) METHOD, APPARATUS, AND SYSTEM FOR REPORTING DATA USAGE

(71) Applicant: Huawei Technologies Co., Ltd., Shenzhen (CN)

(72) Inventor: Yizhuang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 550 days.

(21) Appl. No.: 17/375,671

(22) Filed: Jul. 14, 2021

(65) Prior Publication Data

US 2021/0345174 A1    Nov. 4, 2021

Related U.S. Application Data

(63) Continuation of application No. PCT/CN2019/122481, filed on Dec. 2, 2019.

(30) Foreign Application Priority Data

Jan. 15, 2019  (CN) .......................... 201910035673.3

(51) Int. Cl.
*H04W 28/06* (2009.01)
*H04W 24/10* (2009.01)
(Continued)

(52) U.S. Cl.
CPC ............ *H04W 28/06* (2013.01); *H04W 24/10* (2013.01); *H04W 28/0257* (2013.01); *H04W 28/0268* (2013.01); *H04W 24/08* (2013.01)

(58) Field of Classification Search
CPC . H04W 28/06; H04W 24/10; H04W 28/0257; H04W 28/0268; H04W 24/08;
(Continued)

(56) References Cited

U.S. PATENT DOCUMENTS

| 9,979,835 B1 | 5/2018 | Jiang et al. |
| 2003/0194997 A1 | 10/2003 | Huomo |

(Continued)

FOREIGN PATENT DOCUMENTS

| CN | 102625272 A | 8/2012 |
| CN | 108282342 A | 7/2018 |

(Continued)

OTHER PUBLICATIONS

"Clarification for multiple UL CLs," SA WG2 Meeting #122B, S2-175641, Sophia Antipolis, France, pp. 1-6, 3rd Generation Partnership Project, Valbonne, France (Aug. 21-25, 2017).

(Continued)

*Primary Examiner* — Hardikkumar D Patel
(74) *Attorney, Agent, or Firm* — Leydig, Voit & Mayer, Ltd.

(57) ABSTRACT

Embodiments of this application provide a method, an apparatus, and a system for reporting data usage, so that for a PDU session into which a UL CL user plane network element or a BP user plane network element is inserted, statistics can be accurately collected on data usage. The method includes: An aggregate user plane network element determines discarded data usage of the aggregate user plane network element, and sends the discarded data usage to a session management network element. The first session management network element receives the discarded data usage, and receives transport data usage of one or a plurality of anchor user plane network elements, which are anchor user plane network elements connected to the aggregate user plane network element. The first session management network element determines actual data usage of a terminal device based on the discarded data usage and the transport data usage.

13 Claims, 7 Drawing Sheets

(51) Int. Cl.
*H04W 28/02* (2009.01)
*H04W 24/08* (2009.01)

(58) Field of Classification Search
CPC ...... H04W 4/24; H04L 12/14; H04L 12/1403;
H04M 15/00; H04M 15/41; H04M 15/58;
H04M 15/8214; H04M 15/83; H04M
15/85; H04M 15/62
See application file for complete search history.

(56) References Cited

U.S. PATENT DOCUMENTS

| | | | |
|---|---|---|---|
| 2010/0318647 A1* | 12/2010 | Savoor | H04L 12/1403 709/224 |
| 2013/0231081 A1* | 9/2013 | Mo | H04M 15/61 455/405 |
| 2015/0350958 A1 | 12/2015 | Neubacher | |
| 2018/0027521 A1 | 1/2018 | Kim et al. | |

FOREIGN PATENT DOCUMENTS

| | | |
|---|---|---|
| CN | 109104746 A | 12/2018 |
| CN | 109121170 A | 1/2019 |
| WO | 2019001109 A1 | 1/2019 |

OTHER PUBLICATIONS

"3rd Generation Partnership Project; Technical Specification Group Services and System Aspects; System Architecture for the 5G System; Stage 2 (Release 15)," 3GPP TS 23.501 V15.4.0, pp. 1-236, 3rd Generation Partnership Project (Dec. 2018).

\* cited by examiner

METHOD, APPARATUS, AND SYSTEM FOR REPORTING DATA USAGE

CROSS-REFERENCE TO RELATED APPLICATIONS

This application is a continuation of International Application No. PCT/CN2019/122481, filed on Dec. 2, 2019, which claims priority to Chinese Patent Application No. 201910035673.3, filed on Jan. 15, 2019. The disclosures of the aforementioned applications are hereby incorporated by reference in their entireties.

TECHNICAL FIELD

This application relates to the field of communications technologies, and in particular, to a method, an apparatus, and a system for reporting data usage.

BACKGROUND

In an existing 5th generation (5G) network architecture, to support selective routing of a service to a data network (DN) or support session and service continuity, a session management function (SMF) network element may control a data path of a packet data unit (PDU) session, so that one PDU session has a plurality of N6 interfaces at the same time. A UPF network element that terminates an N6 interface supports an anchor function of the PDU session, and is referred to as an anchor UPF (A-UPF) network element for short. Each A-UPF network element accesses a same DN. Moreover, to support the foregoing session, an uplink classifier (UL CL) function and an internet protocol version 6 (IPv6) multi-homing or multi-link (IPv6 Multi-homing) function are introduced. The UL CL function may be implemented by using a UL CL UPF network element. The IPv6 multi-homing function may be implemented by using a branching point (BP) UPF network element.

Currently, in a PDU session into which no UL CL UPF network element or BP UPF network element is inserted, in a process in which the SMF network element establishes or modifies the PDU session, the SMF network element sends an N4 session modification or establishment request including a packet detection rule (PDR), a quality of service (QoS) enforcement rule (QER), and a usage reporting rule (URR) to the A-UPF network element. The PDR includes packet detection information, which is mainly a packet filter set configured to identify a packet flow of an Ethernet type or an IP type. The QER includes a maximum bit rate (for example, a session aggregate maximum bit rate (session-AMBR)), a gate control state, a guaranteed bit rate, and the like. The URR includes a periodic policy threshold, a reporting trigger, a time-based measurement threshold, and the like. The URR includes a measurement method for indicating to collect statistics on transport data usage. Further, for a downlink, after receiving a DL packet sent by the DN, the A-UPF network element performs packet matching based on the packet filter set in the PDR, and performs, by using the corresponding QER, QoS control on a packet on which matching succeeds. Further, based on the corresponding URR, the A-UPF network element collects statistics on data that is successfully transmitted, and reports the data usage. For an uplink, after receiving a UL packet sent by an access network (AN) device or an intermediate UPF network element (when there are a plurality of UPF network elements), the A-UPF network element performs packet matching based on the packet filter set in the PDR, and performs, by using the corresponding QER, QoS control on a packet on which matching succeeds. Further, based on the corresponding URR, the A-UPF network element collects statistics on data that is successfully transmitted, and reports the data usage.

However, for a PDU session into which a UL CL UPF network element or a BP UPF network element is inserted, data usage on which statistics are collected by the A-UPF network element is inaccurate, and a charging error may further be caused. Therefore, how to accurately collect statistics on data usage is a problem that urgently needs to be resolved at present.

SUMMARY

Embodiments of this application provide a method, an apparatus, and a system for reporting data usage, so that for a PDU session into which a UL CL user plane network element or a BP user plane network element is inserted, statistics can be accurately collected on data usage.

To achieve the foregoing objective, the embodiments of this application use the following technical solutions.

According to a first aspect, a method for collecting statistics on data usage and a corresponding communications apparatus are provided. In this solution, a first session management network element receives discarded data usage of an aggregate user plane network element. The first session management network element receives transport data usage of one or a plurality of anchor user plane network elements, where the one or plurality of anchor user plane network elements are anchor user plane network elements connected to the aggregate user plane network element. The first session management network element determines actual data usage based on the discarded data usage and the transport data usage. The aggregate user plane network element in this embodiment of this application may be a UL CL user plane network element or a BP user plane network element. Therefore, based on this solution, for a PDU session into which a UL CL user plane network element or a BP user plane network element is inserted, statistics can be accurately collected on data usage, to implement accurate charging.

It may be understood that, the actual data usage in this embodiment of this application may be understood as actual data usage of a terminal device. The actual quantity usage of the terminal device, for example, may be actual data usage statistics of a service granularity, or actual data usage statistics of a quality of service QoS flow granularity, or actual user usage of a PDU session granularity, or actual data usage statistics of the service granularity in the case of a specific data network name DNN 1, or actual data usage statistics of the QoS flow granularity in the case of a specific data network name DNN 2, or actual user dosage of the PDU session granularity in the case of the specific data network name DNN 1; or actual data usage statistics of the service granularity in the case of the specific DNN 1 and a specific slice, or actual data usage statistics of the QoS flow granularity in the case of the specific DNN 2 and a specific slice, or any combination of the foregoing granularities, or the like. Unified descriptions are provided herein. This is not specifically limited in this embodiment of this application.

In an embodiment, the plurality of anchor user plane network elements include a first anchor user plane network element and a second anchor user plane network element. That the first session management network element receives transport data usage of a plurality of anchor user plane network elements includes: The first session management network element receives transport data usage of the first anchor user plane network element that is from the first anchor user plane network element; and the first session management network element receives transport data usage of the second anchor user plane network element that is from the second anchor user plane network element. Based on this solution, the first session management network element may obtain the transport data usage of the plurality of anchor user plane network elements.

In an embodiment, the plurality of anchor user plane network elements include a first anchor user plane network element and a second anchor user plane network element. That the first session management network element receives transport data usage of a plurality of anchor user plane network elements includes: The first session management network element receives transport data usage of the first anchor user plane network element that is from the first anchor user plane network element; and the first session management network element receives transport data usage of the second anchor user plane network element that is from a second session management network element. Based on this solution, the first session management network element may obtain the transport data usage of the plurality of anchor user plane network elements.

In an embodiment, this solution further includes: The first session management network element obtains a first packet detection rule PDR and a usage reporting rule URR, where the first PDR includes packet detection information, the URR includes a measurement method, the measurement method is collecting statistics on discarded data usage, and the first PDR is associated with the URR. The first session management network element sends the first PDR and the URR to the aggregate user plane network element. Based on this solution, the aggregate user plane network element may obtain the packet detection information and the corresponding measurement method. Further, the aggregate user plane network element performs service detection based on the packet detection information in the first PDR, and correspondingly collects statistics on the discarded data usage based on the URR.

In an embodiment, the method further includes: The first session management network element obtains a second PDR and a quality of service QoS enforcement rule QER, where the second PDR includes flow identifiers QFIs of one or more non-guaranteed bit rate non-GBR QoS flows, the QER includes a session aggregate maximum bit rate session-AMBR, and the second PDR is associated with the QER. The first session management network element sends the second PDR and the QER to the aggregate user plane network element. Based on this solution, the aggregate user plane network element may obtain the flow identifiers QFIs of the one or more non-GBR QoS flows, and the corresponding session-AMBR. Further, the aggregate user plane network element may match QFIs in received packets with the QFIs in the second PDR, and performs, based on the session-AMBR in the QER, bit rate control on a packet on which matching succeeds.

In an embodiment, the method further includes: The first session management network element receives the QFIs of the one or more non-GBR QoS flows that are from the second session management network element. Correspondingly, that the first session management network element obtains a second PDR includes: The first session management network element generates the second PDR based on the QFIs of the one or more non-GBR QoS flows.

In an embodiment, the method further includes: The first session management network element obtains a second PDR, a QER, and a URR, where the second PDR includes QFIs of one or more non-GBR QoS flows, the QER includes a session-AMBR, the URR includes a measurement method, the measurement method is collecting statistics on discarded data usage, and the second PDR is associated with the URR and the QER. The first session management network element sends the second PDR, the URR, and the QER to the aggregate user plane network element. Based on this solution, the aggregate user plane network element may obtain the flow identifiers QFIs of the one or more non-GBR QoS flows, and the corresponding session-AMBR and measurement method. Further, the aggregate user plane network element may match the QFIs in the received packets with the QFIs in the second PDR, and performs bit rate control on the packet on which matching succeeds based on the session-AMBR in the QER, and correspondingly collects statistics on the discarded data usage based on the URR.

According to a second aspect, a method for collecting statistics on data usage and a corresponding communications apparatus are provided. In this solution, an aggregate user plane network element determines discarded data usage of the aggregate user plane network element. The aggregate user plane network element sends the discarded data usage to a session management network element, where the discarded data usage is used for determining actual data usage. The aggregate user plane network element in this embodiment of this application may be a UL CL user plane network element or a BP user plane network element. The discarded data usage of the aggregate user plane network element may be used for determining the actual data usage. Therefore, based on this solution, for a PDU session into which a UL CL user plane network element or a BP user plane network element is inserted, statistics can be accurately collected on data usage, to implement accurate charging.

In an embodiment, before the aggregate user plane network element determines the discarded data usage of the aggregate user plane network element, the method further includes: The aggregate user plane network element receives a first packet detection rule PDR and a usage reporting rule URR from the session management network element, where the first PDR includes packet detection information, the URR includes a measurement method, the measurement method is collecting statistics on discarded data usage, and the first PDR is associated with the URR. Correspondingly, that the aggregate user plane network element determines discarded data usage of the aggregate user plane network element includes: The aggregate user plane network element determines the discarded data usage of the aggregate user plane network element based on the first PDR and the URR. Based on this solution, the aggregate user plane network element may determine the discarded data usage of the aggregate user plane network element.

In an embodiment, that the aggregate user plane network element determines discarded data usage of the aggregate user plane network element includes: The aggregate user plane network element determines the discarded data usage of the aggregate user plane network element based on a local policy.

In an embodiment, the method further includes: The aggregate user plane network element receives a second PDR and a quality of service QoS enforcement rule QER from the session management network element, where the second PDR includes flow identifiers QFIs of one or more non-guaranteed bit rate non-GBR QoS flows, the QER includes a session aggregate maximum bit rate session-AMBR, and the second PDR is associated with the QER. The aggregate user plane network element matches QFIs in received packets with the QFIs in the second PDR, and performs, based on the session-AMBR in the QER, bit rate control on a packet on which matching succeeds. Based on this solution, the aggregate user plane network element may perform bit rate control on the packet.

In an embodiment, the method further includes: The aggregate user plane network element receives a second PDR, a QER, and a URR from the session management network element, where the second PDR includes QFIs of one or more non-GBR QoS flows, the QER includes a session-AMBR, the URR includes a measurement method, the measurement method is collecting statistics on discarded data usage, and the second PDR is associated with the URR and the QER. The aggregate user plane network element matches QFIs in received packets with the QFIs in the second PDR, and performs, based on the session-AMBR in the QER, bit rate control on a packet on which matching succeeds. Correspondingly, that the aggregate user plane network element determines discarded data usage of the aggregate user plane network element includes: The aggregate user plane network element determines the discarded data usage of the aggregate user plane network element based on the URR. Based on this solution, the aggregate user plane network element may perform bit rate control on the packet, and the aggregate user plane network element may determine the discarded data usage of the aggregate user plane network element.

According to a third aspect, a method for collecting statistics on data usage and a corresponding communications apparatus are provided. In this solution, an aggregate user plane network element determines transport data usage of the aggregate user plane network element. The aggregate user plane network element is a user plane network element connected to a plurality of anchor user plane network elements. The transport data usage is usage of data that is actually transmitted by the aggregate user plane network element and that is from data of the plurality of anchor user plane network elements. The aggregate user plane network element sends the transport data usage to the session management network element. The aggregate user plane network element in this embodiment of this application may be a UL CL user plane network element or a BP user plane network element. The transport data usage of the aggregate user plane network element may be used for determining the actual data usage. Therefore, based on this solution, for a PDU session into which a UL CL user plane network element or a BP user plane network element is inserted, statistics can be accurately collected on data usage, to implement accurate charging.

In an embodiment, before the aggregate user plane network element determines the transport data usage of the aggregate user plane network element, the method further includes: The aggregate user plane network element receives a first packet detection rule PDR and a usage reporting rule URR from the session management network element, where the first PDR includes packet detection information, the URR includes a measurement method, the measurement method is collecting statistics on transport data usage, and the first PDR is associated with the URR. Correspondingly, that the aggregate user plane network element determines transport data usage of the aggregate user plane network element includes: The aggregate user plane network element determines the transport data usage of the aggregate user plane network element based on the first PDR and the URR. Based on this solution, the aggregate user plane network element may determine the transport data usage of the aggregate user plane network element.

In an embodiment, that the aggregate user plane network element determines transport data usage of the aggregate user plane network element includes: The aggregate user plane network element determines the transport data usage of the aggregate user plane network element based on a local policy. Based on this solution, the aggregate user plane network element may determine the transport data usage of the aggregate user plane network element.

In an embodiment, the method further includes: The aggregate user plane network element receives a second PDR and a quality of service QoS enforcement rule QER from the session management network element, where the second PDR includes flow identifiers QFIs of one or more non-guaranteed bit rate non-GBR QoS flows, the QER includes a session aggregate maximum bit rate session-AMBR, and the second PDR is associated with the QER. The aggregate user plane network element matches QFIs in received packets with the QFIs in the second PDR, and performs, based on the session-AMBR in the QER, bit rate control on a packet on which matching succeeds. Based on this solution, the aggregate user plane network element may perform bit rate control on the packet.

In an embodiment, the method further includes: The aggregate user plane network element receives a second PDR, a QER, and a URR from the session management network element, where the second PDR includes QFIs of one or more non-GBR QoS flows, the QER includes a session-AMBR, the URR includes a measurement method, the measurement method is collecting statistics on transport data usage, and the second PDR is associated with the URR and the QER. The aggregate user plane network element matches QFIs in received packets with the QFIs in the second PDR, and performs, based on the session-AMBR in the QER, bit rate control on a packet on which matching succeeds. Correspondingly, that the aggregate user plane network element determines transport data usage of the aggregate user plane network element includes: The aggregate user plane network element determines the transport data usage of the aggregate user plane network element based on the URR. Based on this solution, the aggregate user plane network element may perform bit rate control on the packet, and the aggregate user plane network element may determine the transport data usage of the aggregate user plane network element.

According to a fourth aspect, a communications apparatus is provided, to implement the foregoing methods. The communications apparatus may be the first session management network element in the first aspect, or an apparatus including the first session management network element, or the communications apparatus may be the aggregate user plane network element in the second aspect or the third aspect, or an apparatus including the aggregate user plane network element. The communications apparatus includes a corresponding module, unit, or means for implementing the foregoing methods. The module, unit, or means may be implemented by hardware, software, or hardware executing corresponding software. The hardware or software includes one or more modules or units corresponding to the foregoing functions.

According to a fifth aspect, a communications apparatus is provided, including a processor and a memory, where the memory is configured to store computer instructions, and when the processor executes the instructions, the communications apparatus is enabled to perform the method in any one of the foregoing aspects. The communications apparatus may be the first session management network element in the first aspect, or an apparatus including the first session management network element, or the communications apparatus may be the aggregate user plane network element in the second aspect or the third aspect, or an apparatus including the aggregate user plane network element.

According to a sixth aspect, a communications apparatus is provided, including a processor, where the processor is configured to: be coupled to a memory, and perform, after reading instructions in the memory, the method according to any one of the foregoing aspects according to the instructions. The communications apparatus may be the first session management network element in the first aspect, or an apparatus including the first session management network element, or the communications apparatus may be the aggregate user plane network element in the second aspect or the third aspect, or an apparatus including the aggregate user plane network element.

According to a seventh aspect, a computer-readable storage medium is provided. The computer-readable storage medium stores instructions. When run on a computer, the instructions enable the computer to perform the method in any one of the foregoing aspects.

According to an eighth aspect, a computer program product including instructions is provided. When run on a computer, the computer program product enables the computer to perform the method in any one of the foregoing aspects.

According to a ninth aspect, a communications apparatus (for example, the communications apparatus may be a chip or a chip system) is provided. The communications apparatus includes a processor, configured to implement functions in any one of the foregoing aspects. In an embodiment, the communications apparatus further includes a memory, and the memory is configured to store necessary program instructions and data. When the communications apparatus is a chip system, the chip system may include a chip, or include a chip and other discrete devices.

For technical effects brought by any design manner in the fourth aspect to the ninth aspect, refer to technical effects brought by different design manners in the first aspect, the second aspect, or the third aspect. Details are not described herein again.

According to a tenth aspect, a communications system is provided. The communications system includes a first session management network element and an aggregate user plane network element. The aggregate user plane network element is configured send discarded data usage of the aggregate user plane network element to the first session management network element. The first session management network element is configured to receive the discarded data usage of the aggregate user plane network element. The first session management network element is further configured to receive transport data usage of one or a plurality of anchor user plane network elements, where the one or plurality of anchor user plane network elements are anchor user plane network elements connected to the aggregate user plane network element. The first session management network element is further configured to determine actual data usage based on the discarded data usage and the transport data usage.

In an embodiment, the first session management network element is further configured to perform the method in any possible design in the first aspect.

In an embodiment, when the session management network element in the second aspect is the first session management network element in the first aspect, the aggregate user plane network element is further configured to perform the method in any possible design in the second aspect.

For technical effects brought by any design manner in the tenth aspect, refer to technical effects brought by different design manners in the first aspect or the second aspect. Details are not described herein again.

According to an eleventh aspect, a communications system is provided. The communications system includes a first session management network element and an aggregate user plane network element. The aggregate user plane network element is configured to determine transport data usage of the aggregate user plane network element. The aggregate user plane network element is a user plane network element connected to a plurality of anchor user plane network elements. The transport data usage is usage of data that is actually transmitted by the aggregate user plane network element and that is from data of the plurality of anchor user plane network elements. The aggregate user plane network element is further configured to send the transport data usage to the session management network element. The session management network element is further configured to: receive the transport data usage of the aggregate user plane network element, and determine the transport data usage of the aggregate user plane network element as the actual data usage.

In an embodiment, the aggregate user plane network element is further configured to perform the method in any possible design in the third aspect.

For technical effects brought by any design manner in the eleventh aspect, refer to technical effects brought by different design manners in the third aspect. Details are not described herein again.

DESCRIPTION OF EMBODIMENTS

The following describes the technical solutions in the embodiments of this application with reference to the accompanying drawings in the embodiments of this application. In the descriptions of this application, "I" indicates that associated objects are in an "or" relationship unless otherwise specified. For example, A/B may represent A or B.

In this specification, "and/or" describes only an association relationship for describing associated objects and represents that three relationships may exist. For example, A and/or B may represent the following three cases: Only A exists, both A and B exist, and only B exists. In the three cases, A. B may be singular or plural. In addition, in the descriptions of this application, "a plurality of" means two or more than two. "At least one of the following items" or a similar expression thereof refers to any combination in these items, including any combination of a single item or a plurality of items. For example, at least one of a, b, and c may represent a, b, c, a and b, a and c, b and c, or a, b, and c, where a, b, and c may be singular or plural. In addition, for ease of clearly describing the technical solutions in the embodiments of this application, in the embodiments of this application, words such as "first" and "second" are used to distinguish same items or similar items whose functions and roles are basically the same. A person skilled in the art may understand that words such as "first" and "second" do not limit a quantity and an execution order, and words such as "first" and "second" do not limit a definite difference.

In addition, a network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Figure 1:
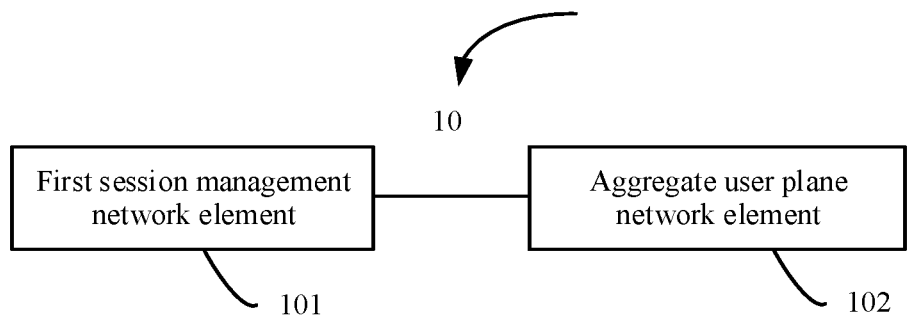
FIG. 1 is a schematic architectural diagram of a communications system according to an embodiment of this application.

FIG. 1 shows a communications system 10 according to an embodiment of this application. The communications system 10 includes a first session management network element 101 and an aggregate user plane network element 102. The first session management network element 101 may directly communicate with the aggregate user plane network element 102, or may communicate with the aggregate user plane network element 102 through forwarding by another device. This is not specifically limited in this embodiment of this application.

The aggregate user plane network element 102 is configured to send discarded data usage of the aggregate user plane network element 102 to the first session management network element 101.

The first session management network element 101 is configured to: receive the discarded data usage of the aggregate user plane network element 102, and receive transport data usage of one or a plurality of anchor user plane network elements, and determine actual data usage based on the discarded data usage and the transport data usage. The one or plurality of anchor user plane network elements are anchor user plane network elements connected to the aggregate user plane network element 102. Connection herein may be connection between the anchor user plane network elements and the aggregate user plane network element 102 without another aggregate UPF network element, or connection between the anchor user plane network elements and the aggregate user plane network element 102 by using another aggregate user plane network element. This is not specifically limited herein.

It may be understood that, the actual data usage in this embodiment of this application may be understood as actual data usage of a terminal device. The actual quantity usage of the terminal device, for example, may be actual data usage statistics of a service granularity, or actual data usage statistics of a QoS flow granularity, or actual user usage of a PDU session granularity, or actual data usage statistics of the service granularity in the case of a specific data network name (DNN) 1, or actual data usage statistics of the QoS flow granularity in the case of a specific DNN 2, or actual user dosage of the PDU session granularity in the case of the specific data network name DNN 1; or actual data usage statistics of the service granularity in the case of the specific DNN 1 and a specific slice, or actual data usage statistics of the QoS flow granularity in the case of the specific DNN 2 and a specific slice, or any combination of the foregoing granularities, or the like. This is not specifically limited in this embodiment of this application.

Specific implementation of the foregoing solution will be described in detail in the subsequent method embodiments.

The aggregate user plane network element in this embodiment of this application may be a UL CL user plane network element or a BP user plane network element. Therefore, based on the communications system, for a PDU session into which a UL CL user plane network element or a BP user plane network element is inserted, statistics can be accurately collected on data usage, to implement accurate charging.

Optionally, the communications system 10 shown in FIG. 1 may be applied to a currently discussed 5th generation (5G) network, another future network, or the like. This is not specifically limited in this embodiment of this application.

Figure 2:
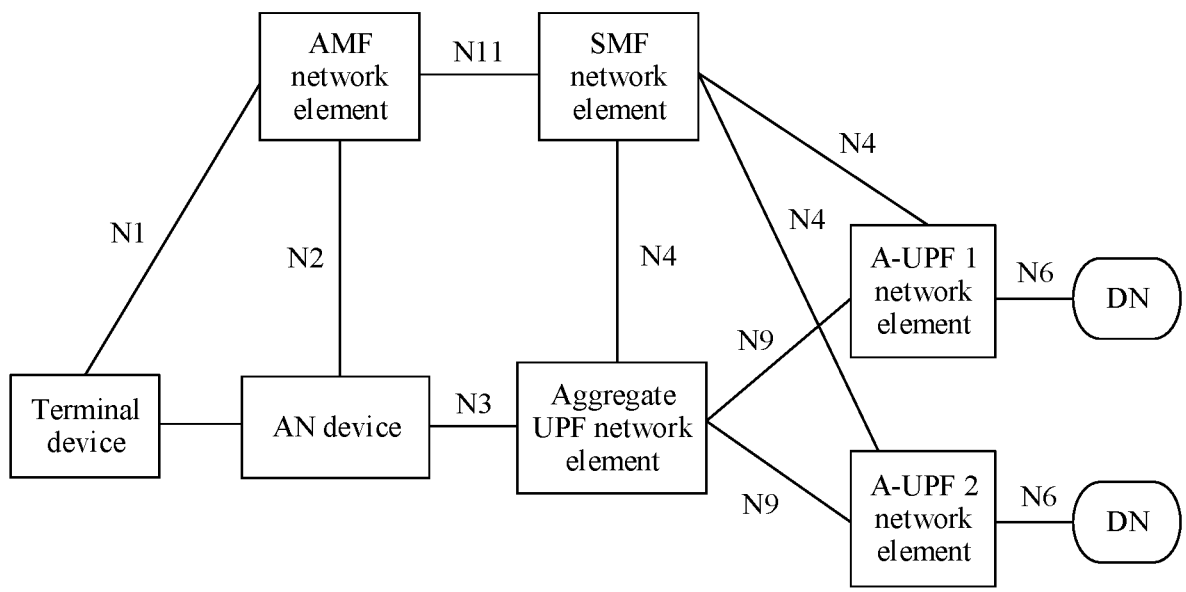
FIG. 2 is a schematic diagram of a 5G network architecture according to an embodiment of this application.

For example, for a scenario in which there is only one service session management network element for a PDU session into which the aggregate user plane network element 102 is inserted, assuming that the communications system 10 shown in FIG. 1 is applied to the currently discussed 5G network, as shown in FIG. 2, a network element or an entity corresponding to the aggregate user plane network element 102 may be an aggregate UPF network element in the 5G network, and a network element or an entity corresponding to the first session management network element 101 may be an SMF network element in the 5G network.

In this embodiment of this application, the aggregate UPF network element (including the aggregate UPF network element in FIG. 2 or FIG. 3, or an aggregate UPF 1 network element or an aggregate UPF 2 network element in FIG. 3A), for example, may be a UL CL UPF network element or a BP UPF network element. Unified descriptions are provided herein. This is not specifically limited in this embodiment of this application.

In addition, as shown in FIG. 2, the 5G network may further include a plurality of A-UPF network elements, such as an A-UPF 1 network element and an A-UPF 2 network element in FIG. 2. In addition, the 5G network may further include an AN device, an access and mobility management function (AMF) network element, an SMF network element, and the like.

The terminal device communicates with the AMF network element by using a next generation network (next generation, N) 1 interface (N1 for short). The AN device communicates with the AMF network element by using an N2 interface (N2 for short). The AN device communicates with the aggregate UPF network element by using an N3 interface (N3 for short). The aggregate UPF network element communicates with the A-UPF 1 network element and the A-UPF 2 network element by using an N9 interface (N9 for short). The AMF network element communicates with the SMF network element by using an N11 interface (N11 for short). The SMF network element communicates with the aggregate UPF network element, the A-UPF 1 network element, and the A-UPF 2 network element by using an N4 interface (N4 for short). The A-UPF 1 network element and the A-UPF 2 network element communicate with a DN by using an N6 interface (N6 for short).

It should be noted that the aggregate UPF network element and the A-UPF 1 network element in FIG. 2 may be jointly deployed, or may be separately deployed. Alternatively, the aggregate UPF network element and the A-UPF 2 network element in FIG. 2 may be jointly deployed, or may be separately deployed. In FIG. 2, an example in which the aggregate UPF network element and the A-UPF 1 network element are separately deployed, and the aggregate UPF network element and the A-UPF 2 network element are separately deployed is merely used for description. This is not specifically limited in this embodiment of this application.

Figure 3:
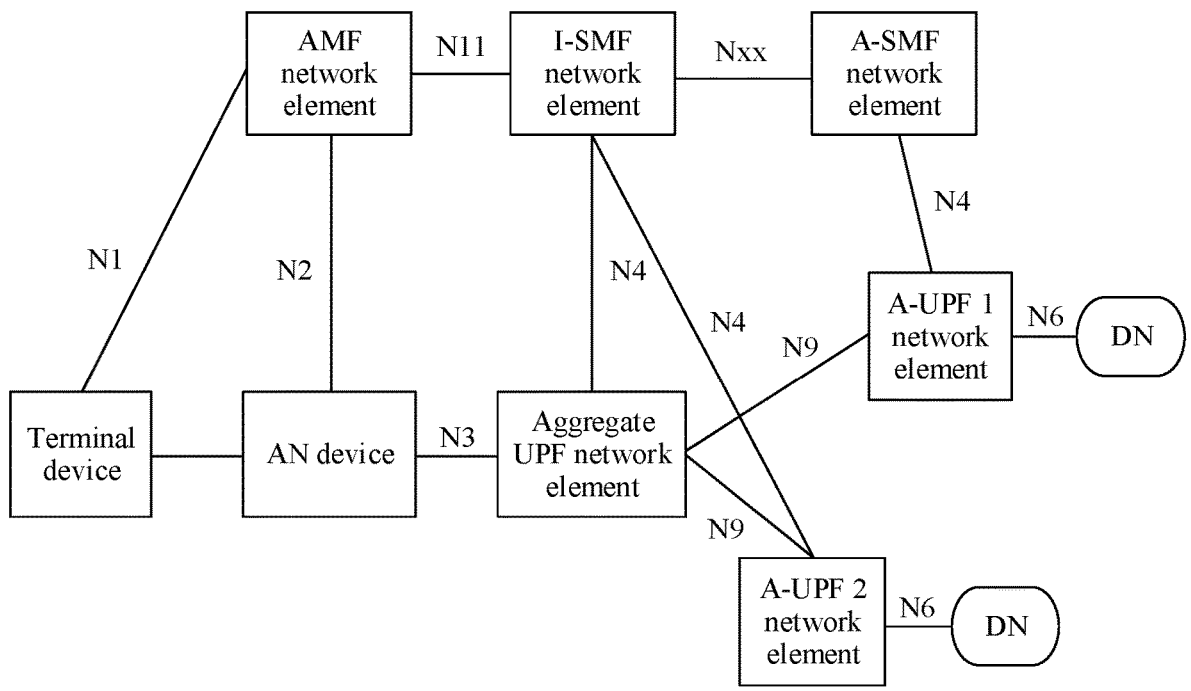
FIG. 3 is a schematic diagram of another 5G network architecture according to an embodiment of this application.

Alternatively, for example, for a scenario in which there are a plurality of service session management network elements (the following uses two service session management network elements as an example for description) for the PDU session into which the aggregate user plane network element 102 is inserted, assuming that the communications system 10 shown in FIG. 1 is applied to the currently discussed 5G network, as shown in FIG. 3, the network element or entity corresponding to the aggregate user plane network element 102 may be the aggregate UPF network element in the 5G network, and the network element or entity corresponding to the first session management network element 101 may be an anchor SMF (A-SMF) network element or an intermediate SMF (I-SMF) network element in the 5G network.

In addition, as shown in FIG. 3, the 5G network may further include a plurality of A-UPF network elements, such as the A-UPF 1 network element and the A-UPF 2 network element in FIG. 3. In addition, the 5G network may further include the AN device, the AMF network element, the SMF network element, and the like.

The terminal device communicates with the AMF network element by using the N1 interface (N1 for short). The AN device communicates with the AMF network element by using the N2 interface (N2 for short). The AN device communicates with the aggregate UPF network element by using the N3 interface (N3 for short). The aggregate UPF network element communicates with the A-UPF 1 network element and the A-UPF 2 network element by using the N9 interface (N9 for short). The AMF network element communicates with the I-SMF network element by using the N11 interface (N11 for short). The I-SMF network element communicates with the aggregate UPF network element and the A-UPF 2 network element by using the N4 interface (N4 for short). The I-SMF network element communicates with the A-SMF network element by using an Nxx interface (Nxx for short). The A-SMF network element communicates with the A-UPF 1 network element by using the N4 interface (N4 for short). The A-UPF 1 network element and the A-UPF 2 network element communicate with the DN by using the N6 interface (N6 for short).

It should be noted that, the aggregate UPF network element and the A-UPF 1 network element in FIG. 3 may be jointly deployed, or may be separately deployed. In FIG. 3, an example in which the aggregate UPF network element and the A-UPF 1 network element are separately deployed is merely used for description. This is not specifically limited in this embodiment of this application.

Figure 3A:
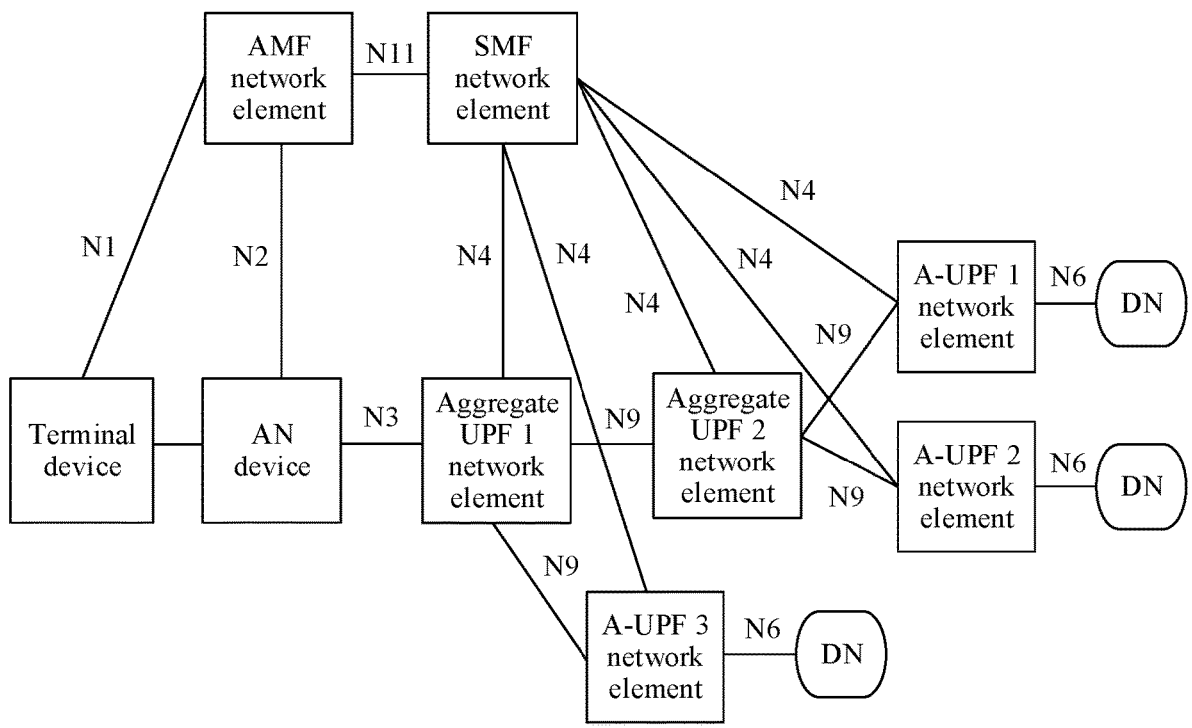
FIG. 3A is a schematic diagram of still another 5G network architecture according to an embodiment of this application.

Alternatively, for example, for a scenario in which there is only one service session management network element, but there are a plurality of aggregate UPF network elements for the PDU session into which the aggregate user plane network element 102 is inserted, assuming that the communications system 10 shown in FIG. 1 is applied to the currently discussed 5G network, as shown in FIG. 3A, the network element or entity corresponding to the aggregate user plane network element 102 may be the aggregate UPF 1 network element in the 5G network, and the network element or entity corresponding to the first session management network element 101 may be the SMF network element in the 5G network.

In addition, as shown in FIG. 3A, the 5G network may further include the aggregate UPF 2 network element and a plurality of A-UPF network elements, such as the A-UPF 1 network element, the A-UPF 2 network element, and an A-UPF 3 network element in FIG. 3A. In addition, the 5G network may further include the AN device, the AMF network element, the SMF network element, and the like. There is no another aggregate UPF network element between the aggregate UPF 1 network element and the AN device.

The terminal device communicates with the AMF network element by using the N1 interface (N1 for short). The AN device communicates with the AMF network element by using the N2 interface (N2 for short). The AN device communicates with the aggregate UPF 1 network element by using the N3 interface (N3 for short). The aggregate UPF 1 network element communicates with the A-UPF 3 network element and the aggregate UPF 2 network element by using the N9 interface (N9 for short). The AMF network element communicates with the SMF network element by using the N11 interface (N11 for short). The SMF network element communicates with the aggregate UPF 1 network element, the aggregate UPF 2 network element, the A-UPF 1 network element, the A-UPF 2 network element, and the A-UPF 3 network element by using the N4 interface (N4 for short). The aggregate UPF 2 network element communicates with the A-UPF 1 network element and the A-UPF 2 network element by using the N9 interface (N9 for short). The A-UPF 1 network element, the A-UPF 2 network element, and the A-UPF 3 network element communicate with the DN by using the N6 interface (N6 for short).

It should be noted that the aggregate UPF 1 network element and the A-UPF 3 network element in FIG. 3A may be jointly deployed, or may be separately deployed. Alternatively, the aggregate UPF 2 network element and the A-UPF 2 network element in FIG. 3A may be jointly deployed, or may be separately deployed. Alternatively, the aggregate UPF 2 network element and the A-UPF 1 network element in FIG. 3A may be jointly deployed, or may be separately deployed. In FIG. 3A, an example in which the aggregate UPF 1 network element and the A-UPF 3 network element are separately deployed, the aggregate UPF 2 network element and the A-UPF 1 network element are separately deployed, and the aggregate UPF 2 network element and the A-UPF 2 network element are separately deployed is merely used for description. This is not specifically limited in this embodiment of this application.

In addition, it should be noted that a control plane network element such as the AMF network element or the SMF network element in the 5G network architecture shown in FIG. 2, FIG. 3, or FIG. 3A may alternatively perform interaction by using a service-based interface. For example, a service-based interface provided by the AMF network element to outside may be Namf, and a service-based interface provided by the SMF network element to outside may be Nsmf. For related descriptions, refer to a 5G system architecture (5G system architecture) diagram in 3GPP TS23.501. Details are not described herein.

Optionally, the terminal device in this embodiment of this application may be a device configured to implement a wireless communication function, for example, a terminal, or a chip that may be used in the terminal. The terminal device may be user equipment (UE), an access terminal, a terminal unit, a terminal station, a mobile station, a mobile console, a remote station, a remote terminal, a mobile device, a wireless communications device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, or another processing device connected to a wireless modem, an in-vehicle device, or a wearable device, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. The terminal may be mobile or fixed.

Optionally, an access device in this embodiment of this application is a device that accesses a core network, for example, may be a base station, a broadband network gateway (BNG), an aggregation switch, a non-3rd generation partnership project (3GPP) access device, or the like. The base station may include a macro base station, for example, a micro base station (also referred to as a small cell), a relay station, an access point, and or the like in various forms.

Optionally, the aggregate user plane network element or the first session management network element in this embodiment of this application may also be referred to as a communications apparatus, which may be a general-purpose device or a dedicated device. This is not specifically limited in this embodiment of this application.

Optionally, a related function of the aggregate user plane network element or the first session management network element in this embodiment of this application may be implemented by one device, or may be jointly implemented by a plurality of devices, or may be implemented by one or more function modules in one device. This is not specifically limited in this embodiment of this application. It may be understood that the foregoing function may be a network element in a hardware device, or may be a software function running on dedicated hardware, or a combination of hardware and software, or a virtualization function instantiated on a platform (for example, a cloud platform).

Figure 4:
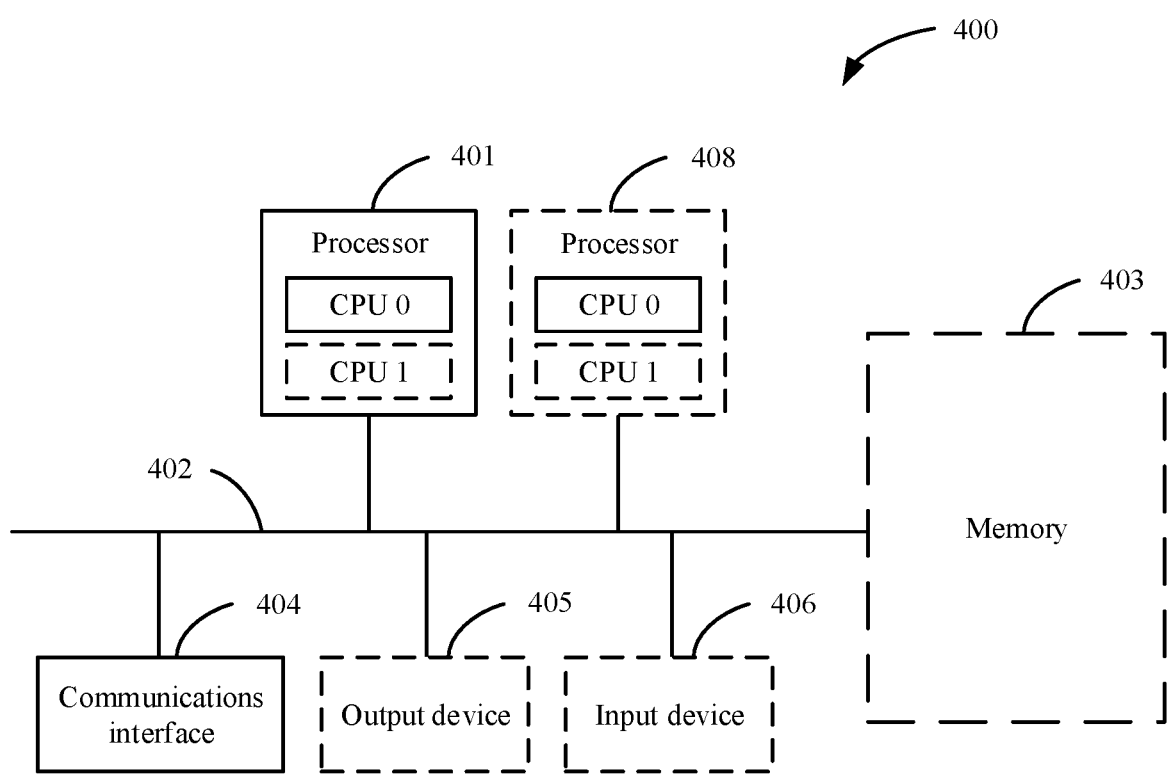
FIG. 4 is a schematic structural diagram of a communications device according to an embodiment of this application.

For example, the related function of the aggregate user plane network element or the first session management network element in this embodiment of this application may be implemented by using a communications device 400 in FIG. 4. FIG. 4 is a schematic structural diagram of the communications device 400 according to an embodiment of this application. The communications device 400 includes one or more processors 401, a communications line 402, and at least one communications interface (in FIG. 4, an example in which a communications interface 404 and one processor 401 are included is merely used for description), and optionally, may further include a memory 403.

The processor 401 may be a general-purpose central processing unit (CPU), a microprocessor, an application-specific integrated circuit (ASIC), or one or more integrated circuits configured to control program execution of solutions of this application.

The communications line 402 may include a path for connecting different components.

The communications interface 404 may be a transceiver module, configured to communicate with another device or a communications network, such as the Ethernet, a RAN, or a wireless local area network (WLAN). For example, the transceiver module may be an apparatus such as a transceiver or a receiver and transmitter. Optionally, the communications interface 404 may alternatively be a transceiver circuit located in the processor 401, to implement signal input and signal output of the processor.

The memory 403 may be an apparatus having a storage function. For example, the memory 403 may be a read-only memory (ROM) or another type of static storage device that may store static information and instructions, a random access memory (RAM), or another type of dynamic storage device that may store information and instructions, or may be an electrically erasable programmable read-only memory (EEPROM), a compact disc read-only memory (CD-ROM), or other optical disk storage, optical disc storage (including a compact disc, a laser disc, an optical disc, a digital versatile disc, a Blu-ray disc, and the like), a disk storage medium or another magnetic storage device, or any other medium that can be used for carrying or storing expected program code in a form of an instruction or a data structure and that can be accessed by a computer, but is not limited thereto. The memory may exist independently, and is connected to the processor by using the communications line 402. Alternatively, the memory may be integrated with the processor.

The memory 403 is configured to store computer executable instructions for executing the solutions of this application, and the processor 401 controls execution. The processor 401 is configured to execute the computer executable instructions stored in the memory 403, to implement a method for collecting statistics on data usage provided in the embodiments of this application.

Alternatively, optionally, in this embodiment of this application, alternatively, the processor 401 performs a processing-related function in the method for collecting statistics on data usage provided in the following embodiments of this application, and the communications interface 404 is responsible for communicating with another device or a communications network. This is not specifically limited in this embodiment of this application.

Optionally, the computer executable instructions in this embodiment of this application may also be referred to as application code. This is not specifically limited in this embodiment of this application.

During specific implementation, in an embodiment, the processor 401 may include one or more CPUs, for example, a CPU 0 and a CPU 1 in FIG. 4.

During specific implementation, in an embodiment, the communications device 400 may include a plurality of processors, for example, the processor 401 and a processor 408 in FIG. 4. Each of these processors may be a single-core (single-CPU) processor, or may be a multi-core (multi-CPU) processor. The processor herein may refer to one or more devices, circuits, and/or processing cores configured to process data (for example, computer program instructions).

During specific implementation, in an embodiment, the communications device 400 may further include an output device 405 and an input device 406. The output device 405 communicates with the processor 401, and may display information in a plurality of manners. For example, the output device 405 may be a liquid crystal display (LCD), a light emitting diode (LED) display device, a cathode ray tube (CRT) display device, a projector (projector), or the like. The input device 406 communicates with the processor 401, and may receive an input of a user in a plurality of manners. For example, the input device 406 may be a mouse, a keyboard, a touchscreen device, a sensing device, or the like.

The communications device 400 may also be referred to as a communications apparatus sometimes, and may be a general-purpose device or a dedicated device. For example, the communications device 400 may be a desktop computer, a portable computer, a network server, a personal digital assistant (PDA), a mobile phone, a tablet computer, a wireless terminal device, an embedded device, the foregoing terminal device, the foregoing network device, or a device having a structure similar to that in FIG. 4. A type of the communications device 400 is not limited in this embodiment of this application.

The method for collecting statistics on data usage provided in the embodiments of this application is described in detail below with reference to FIG. 1 to FIG. 4.

It should be noted that a name of a message between network elements or a name of each parameter in a message in the following embodiments of this application is merely an example, and may alternatively be another name during specific implementation. This is not specifically limited in this embodiment of this application.

Figure 5:
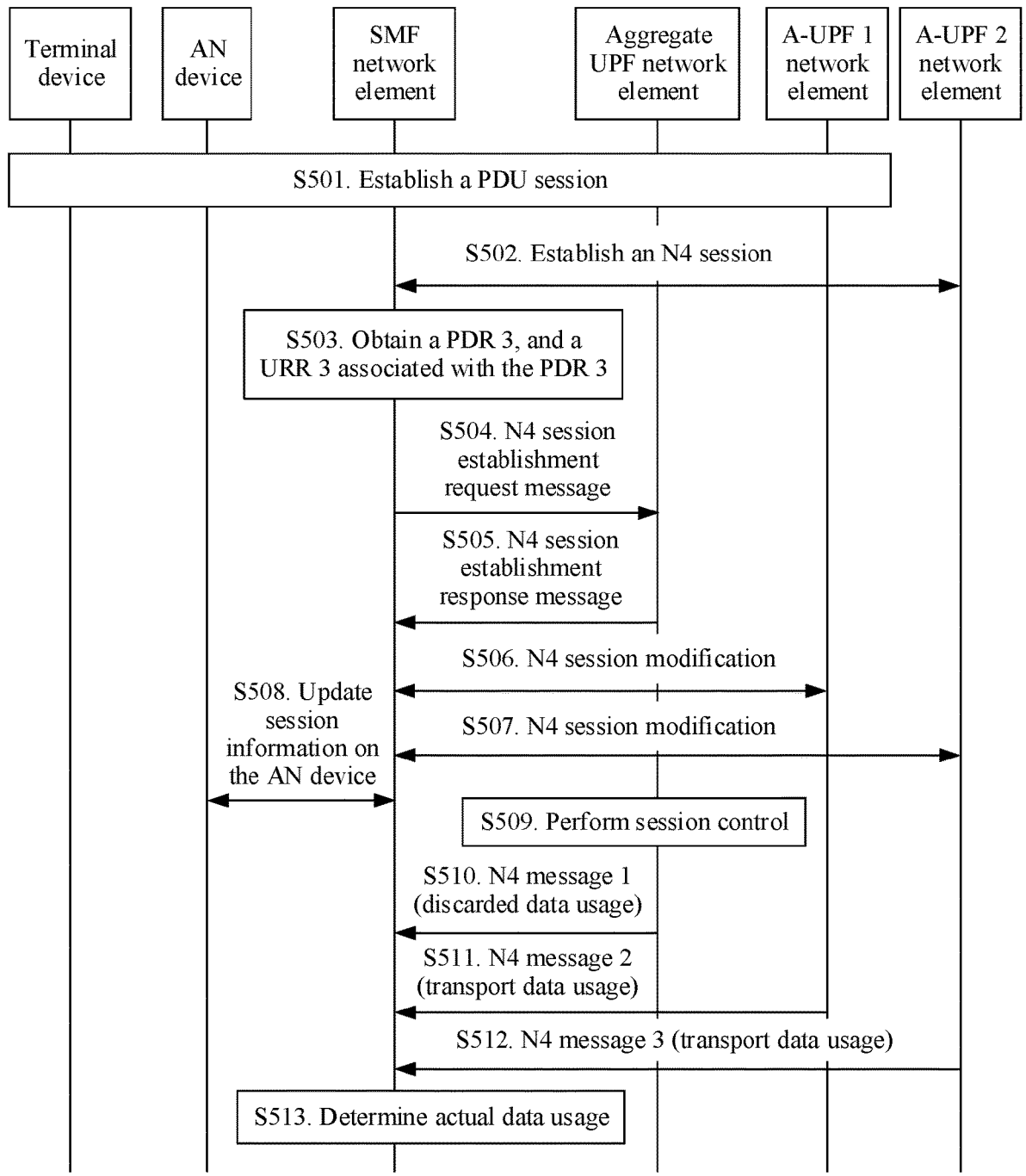
FIG. 5 is a schematic flowchart 1 of a method for collecting statistics on data usage according to an embodiment of this application.

For example, the communications system shown in FIG. 1 is applied to the 5G network shown in FIG. 2. FIG. 5 shows a method for collecting statistics on data usage according to an embodiment of this application, including the following steps.

S501. A terminal device establishes a PDU session, where an anchor of the PDU session is an A-UPF 1 network element.

In a process in which the PDU session is established, the A-UPF 1 network element may obtain a PDR 1 including packet detection information 1, a QER 1 including a session-AMBR 1, and a URR 1 including a measurement method 1 (the measurement method 1 is collecting statistics on transport data usage) from an SMF network element, further, the A-UPF 1 network element may associate the PDR 1 with the QER 1, and the A-UPF 1 network element may associate the PDR 1 with the URR 1. A method for associating the PDR 1 with the URR 1 by the A-UPF 1 network element may be including an identifier of the URR 1 into the PDR 1, or associating corresponding information for storage. A method for associating the PDR 1 with the QER 1 by the A-UPF 1 network element may be including an identifier of the QER 1 into the PDR 1, or associating corresponding information for storage. This is not specifically limited in this embodiment of this application.

The packet detection information 1 herein is mainly a packet filter set. The packet filter set may include one or more packet filters. The packet filter set is configured to identify a packet flow of an Ethernet type or an IP type. A packet filter of the IP type may include a combination of a source IP address, a destination IP address, an IPv6 prefix, a source port number, a destination port number, a protocol ID, a flow label, a direction, and the like. A packet filter of the Ethernet type may include a combination of a source media access control (MAC) address, a destination MAC address, an Ethernet type, a direction, and the like.

The session-AMBR 1 herein is used for performing session-AMBR control. Refer to an existing implementation for a related function. Details are not described herein.

In addition, apart from the session-AMBR 1, the QER 1 may further include information such as a gate control state and a guaranteed bit rate. Refer to an existing implementation for a related function. Details are not described herein. Similarly, a QER (such as a QER 2 or a QER 3) in the following steps may also include other information than a session-AMBR, for example, information such as the gate control state and the guaranteed bit rate. Unified descriptions are provided herein. Details are not described again in the following.

For a specific implementation of step S501, refer to an existing implementation. Details are not described herein.

S502. After step S501 is performed, the SMF network element determines that a new PDU session anchor needs to be established due to mobility or a new service flow detection requirement. Then, after the SMF network element selects an A-UPF 2 network element as the new PDU session anchor, the SMF network element establishes an N4 session with the A-UPF 2 network element.

In a process in which the N4 session is established, the A-UPF 2 network element may obtain a PDR 2 including packet detection information 2, the QER 2 including a session-AMBR 2, and a URR 2 including a measurement method 2 (the measurement method 2 is collecting statistics on the transport data usage) from the SMF network element, further, the A-UPF 2 network element may associate the PDR 2 with the QER 2, and the A-UPF 2 network element may associate the PDR 2 with the URR 2. A method for associating the PDR 2 with the URR 2 by the A-UPF 2 network element may be including an identifier of the URR 2 into the PDR 2, or associating corresponding information for storage. A method for associating the PDR 2 with the QER 2 by the A-UPF 2 network element may be including an identifier of the QER 2 into the PDR 2, or associating corresponding information for storage. This is not specifically limited in this embodiment of this application.

For related descriptions of the packet detection information 2 and the session-AMBR 2, refer to related descriptions of the packet detection information 1 and the session-AMBR 1 in step S501, and details are not described herein again.

For a specific implementation of step S502, refer to an existing implementation. Details are not described herein.

S503. The SMF network element obtains a PDR 3, and a URR 3 associated with the PDR 3.

The PDR 3 includes flow identifiers (QoS flow identifier, QFI) of one or more non-guaranteed bit rate QoS flows (namely, non-guaranteed bit rate (non-GBR) QoS flow), used for performing corresponding service detection. The URR 3 includes a measurement method 3. The measurement method 3 is collecting statistics on discarded data usage.

Optionally, in this embodiment of this application, the PDR 3 may further include service data flow (SDF) information/application identifier, used for detecting a packet corresponding to the SDF information/application identifier in the case of one or more QFIs. Alternatively, the PDR 3 may include the SDF information/application identifier, and indication information 1, where the indication information 1 indicates to detect other packets than the packet corresponding to the SDF information/application identifier in the case of the one or more QFIs. Alternatively, the PDR 3 may further include indication information 2, where the indication information 2 indicates to detect other packets than the packet corresponding to the one or more QFIs.

Certainly, the PDR 3 may alternatively not include the foregoing one or more QFIs. For example, the PDR 3 may include the SDF information/application identifier, used for detecting a packet corresponding to the SDF information/application identifier. Alternatively, the PDR 3 may include the SDF information/application identifier, and indication information 3, where the indication information 3 indicates to detect other packets than the packet corresponding to the SDF information/application identifier.

Optionally, when packet detection information on which statistics are collected is the same as detection information used for performing session-AMBR control, the SMF network element may obtain the QER 3 associated with the PDR 3. The QER 3 includes a session-AMBR 3, used for performing session-AMBR control.

Alternatively, optionally, when the packet detection information on which statistics are collected is different from the detection information used for performing session-AMBR control, the SMF network element may obtain a PDR 4, and a QER 4 associated with the PDR 4. The PDR 4 includes packet detection information 4, used for performing packet detection. The QER 4 includes a session-AMBR 4, used for performing session-AMBR control.

For related descriptions of the packet detection information 4, the session-AMBR 3, and the session-AMBR 4, refer to related descriptions of the packet detection information 1 and the session-AMBR 1 in step S501, and details are not described herein again.

Optionally, in this embodiment of this application, that the SMF network element obtains a PDR 3, and a URR 3 associated with the PDR 3 may specifically include: The SMF network element generates the PDR 3 and the URR 3 associated with the PDR 3 based on pre-configured charging information or charging information provided by a policy control function (PCF) network element.

Optionally, in this embodiment of this application, that the SMF network element obtains a URR 3 associated with the PDR 3 may specifically include: The SMF network element generates the QER 3 associated with the PDR 3 based on pre-configured QoS control information or QoS control information provided by the PCF network element.

Optionally, in this embodiment of this application, that the SMF network element may obtain a PDR 4 and a QER 4 associated with the PDR 4 may specifically include: The SMF network element generates the PDR 4 and the QER 4 associated with the PDR 4 based on the pre-configured QoS control information or the QoS control information provided by the PCF network element.

Optionally, in this embodiment of this application, a method for associating the PDR 3 with the URR 3 may be including an identifier of the URR 3 into the PDR 3, or associating corresponding information for storage.

Optionally, in this embodiment of this application, a method for associating the PDR 3 with the QER 3 may be including an identifier of the QER 3 into the PDR 3, or associating corresponding information for storage.

Optionally, in this embodiment of this application, a method for associating the PDR 4 with the QER 4 may be including an identifier of the QER 4 into the PDR 4, or associating corresponding information for storage.

S504. The SMF network element sends a message 1 to an aggregate UPF network element. The aggregate UPF network element receives the message 1 from the SMF network element. The message 1 includes the PDR 3, and the URR 3 associated with the PDR 3.

For example, as shown in FIG. 5, the message 1, for example, may be an N4 session establishment request message.

Optionally, if the SMF network element may obtain the QER 3 associated with the PDR 3 in step S503, the message 1 may further include the QER 3 associated with the PDR 3.

Alternatively, optionally, if the SMF network element may obtain the PDR 4, and the QER 4 associated with the PDR 4 in step S503, the message 1 may further include the PDR 4, and the QER 4 associated with the PDR 4.

Optionally, the message 1 may further include first tunnel information. The first tunnel information includes tunnel information required by the aggregate UPF network element to send data to the A-UPF 1 network element and the A-UPF 2 network element.

Optionally, the tunnel information (including the first tunnel information herein and the following second tunnel information, third tunnel information, and the like) in this embodiment of this application, for example, may include an IP address and a tunnel identifier. Unified descriptions are provided herein. Details are not described again in the following.

S505. The aggregate UPF network element sends a message 2 to the SMF network element. The SMF network element receives the message 2 from the aggregate UPF network element.

For example, as shown in FIG. 5, the message 2, for example, may be an N4 session establishment response message.

Optionally, the message 2 may include second tunnel information. The second tunnel information includes tunnel information required by the aggregate UPF network element to send data to an AN device.

S506. The SMF network element updates PDU session information of the A-UPF 1 network element by using an N4 session modification procedure.

That the SMF network element updates PDU session information of the A-UPF 1 network element by using an N4 session modification procedure may specifically include: The SMF network element sends third tunnel information to the A-UPF 1 network element, where the third tunnel information includes tunnel information required by the A-UPF 1 network element to send downlink data to the aggregate UPF network element. For a related implementation, refer to an existing implementation. Details are not described herein.

It should be noted that, in this embodiment of this application, if the aggregate UPF network element and the A-UPF 1 network element are jointly deployed, step S506 does not need to be performed. Unified descriptions are provided herein. Details are not described again in the following.

S507. The SMF network element updates PDU session information of the A-UPF 2 network element by using the N4 session modification procedure.

That the SMF network element updates PDU session information of the A-UPF 2 network element by using the N4 session modification procedure may specifically include: The SMF network element sends fourth tunnel information to the A-UPF 2 network element, where the fourth tunnel information includes tunnel information required by the A-UPF 2 network element to send downlink data to the aggregate UPF network element. For a related implementation, refer to an existing implementation. Details are not described herein.

It should be noted that, in this embodiment of this application, if the aggregate UPF network element and the A-UPF 2 network element are jointly deployed, step S507 does not need to be performed. Unified descriptions are provided herein. Details are not described again in the following.

S508. The SMF network element updates session information on the AN device.

That the SMF network element updates session information on the AN device may specifically include: The SMF network element sends fifth tunnel information to the AN device, where the fifth tunnel information includes tunnel information required by the AN device to send data to the aggregate UPF network element. For a related implementation, refer to an existing implementation. Details are not described herein.

S509. In a data transmission process, the aggregate UPF network element performs session control.

Optionally, in this embodiment of this application, if the message 1 further includes the QER 3 associated with the PDR 3, that the aggregate UPF network element performs session control may include: The aggregate UPF network element matches QFIs in packets with the QFIs in the PDR 3, and performs bit rate control on a packet on which matching succeeds based on a value of the session-AMBR 3 in the QER 3. When a transmission bit rate of the packet exceeds the value of the session-AMBR 3, the packet is discarded.

Alternatively, optionally, in this embodiment of this application, if the message 1 further includes the QER 4 associated with the PDR 4, that the aggregate UPF network element performs session control may include: The aggregate UPF network element matches the QFIs in the packets with the QFIs in the PDR 4, and performs bit rate control on a packet on which matching succeeds based on a value of the session-AMBR 4 in the QER 4. When the transmission bit rate of the packet exceeds the value of the session-AMBR 4, the packet is discarded.

In addition, in this embodiment of this application, that the aggregate UPF network element performs session control specifically includes: The aggregate UPF network element determines discarded data usage of the aggregate UPF network element.

In a possible implementation, that the aggregate UPF network element determines discarded data usage of the aggregate UPF network element includes: The aggregate UPF network element determines the discarded data usage of the aggregate UPF network element based on a local policy.

For example, the local policy herein, for example, may be: collecting statistics on discarded data usage of a service granularity, or collecting statistics on discarded data usage of a QoS flow granularity, or collecting statistics on discarded data usage of a PDU session granularity, or collecting statistics on discarded data usage of the service granularity in the case of a specific DNN 1, or collecting statistics on discarded data usage of the QoS flow granularity in the case of a specific DNN 2, or collecting statistics on discarded data usage of the PDU session granularity in the case of the specific DNN 1; or collecting statistics on discarded data usage of the service granularity in the case of the specific DNN 1 and a specific slice, or collecting statistics on discarded data usage of the QoS flow granularity in the case of the specific DNN 2 and a specific slice, or any combination of the foregoing granularities, or the like.

Alternatively, in another possible implementation, that the aggregate UPF network element determines discarded data usage of the aggregate UPF network element includes: The aggregate UPF network element determines the discarded data usage of the aggregate UPF network element based on the PDR 3 and the URR 3 in the message 1. As described above, the PDR 3 is used for performing corresponding service detection, and the URR 3 indicates to collect statistics on the discarded data usage.

Optionally, in this embodiment of this application, the aggregate UPF network element may alternatively collect statistics on discarded packets always based on the QoS flow granularity, or collect statistics on the discarded packets always based on the service flow granularity. This is not specifically limited in this embodiment of this application.

S510. The aggregate UPF network element sends a message 3 to the SMF network element. The SMF network element receives the message 3 from the aggregate UPF network element. The message 3 includes the discarded data usage of the aggregate UPF network element.

For example, as shown in FIG. 5, the message 3, for example, may be an N4 message 1.

S511. After collecting statistics on the transport data usage based on the PDR 1 and the URR 1, the A-UPF 1 network element sends a message 4 to the SMF network element, and the SMF network element receives the message 4 from the A-UPF 1 network element. The message 4 includes the transport data usage of the A-UPF 1 network element.

For example, as shown in FIG. 5, the message 4, for example, may be an N4 message 2.

S512. After collecting statistics on the transport data usage based on the PDR 2 and the URR 2, the A-UPF 2 network element sends a message 5 to the SMF network element, and the SMF network element receives the message 5 from the A-UPF 2 network element. The message 5 includes the transport data usage of the A-UPF 2 network element.

For example, as shown in FIG. 5, the message 5, for example, may be an N4 message 3.

Optionally, in this embodiment of this application, there is no necessary execution order among the steps S510, S511, and S512. Any one of the steps may be performed first, and then other steps are performed. Alternatively, any two of the steps may be first performed simultaneously, and then the remaining step is performed. Alternatively, steps S510, S511, and S512 may be performed simultaneously. This is not specifically limited in this embodiment of this application.

Alternatively, optionally, in this embodiment of this application, after receiving the transport data usage of the A-UPF 1 network element and the transport data usage of the A-UPF 2 network element, the SMF network element may request the aggregate UPF network element for the discarded data usage of the aggregate UPF network element, and further, the aggregate UPF network element sends the discarded data usage of the aggregate UPF network element to the SMF network element (namely, performs step S510). This is not specifically limited in this embodiment of this application.

S513. The SMF network element determines actual data usage based on the transport data usage of the A-UPF 1 network element, the transport data usage of the A-UPF 2 network element, and the discarded data usage of the aggregate UPF network element.

For example, the actual data usage=(the transport data usage of the A-UPF 1 network element+the transport data usage of the A-UPF 2 network element)—the discarded data usage of the aggregate UPF network element.

Optionally, in this embodiment of this application, after obtaining the actual data usage of a terminal device, the SMF network element may further report the actual data usage to a PCF network element, so that the PCF network element collects statistics on charging and the like based on the actual data usage. This is not specifically limited in this embodiment of this application.

At this point, execution of the method for collecting statistics on data usage provided in this embodiment of this application is completed.

Optionally, in this embodiment of this application, after the PDU session including the aggregate UPF network element is established, in a process in which a new QoS flow is established or an established QoS flow is deleted, if the QoS flow is a non-GBR QoS flow, the SMF network element may further send updated PDR information to the aggregate UPF network element. The updated PDR information, for example, may be used for deleting or adding a corresponding QFI. This is not specifically limited in this embodiment of this application.

Based on the method for collecting statistics on data usage provided in this embodiment of this application, for a PDU session into which a UL CL UPF network element or a BP UPF network element is inserted, statistics can be accurately collected on data usage, to implement accurate charging.

The actions of the SMF network element or the aggregate UPF network element in the foregoing steps S501 to S513 may be performed by the processor 401 in the communications device 400 shown in FIG. 4 by invoking the application code stored in the memory 403. This is not limited in this embodiment.

Alternatively, optionally, using an example in which the communications system shown in FIG. 1 is applied to the 5G network shown in FIG. 3A, the embodiments of this application may further provide a method for collecting statistics on data usage. The method for collecting statistics on data usage is similar to the embodiment shown in FIG. 5. A difference, for example, lies in that, in this embodiment of this application, an aggregate UPF 1 network element collects statistics on discarded data usage, an SMF network element determines actual data usage based on the discarded data usage of the aggregate UPF 1 network element that is sent by the aggregate UPF 1 network element, transport data usage of an A-UPF 1 network element, transport data usage of an A-UPF 2 network element, and transport data usage of an A-UPF 3 network element, and then sends and reports the actual data usage to a PCF network element, so that the PCF network element collects statistics on charging and the like based on the actual data usage. An essence of this solution may be understood as follows: In a scenario in which there are a plurality of aggregate UPF network elements, only one aggregate UPF network element needs to collect statistics on the discarded data usage, and other aggregate UPF network elements do not need to collect statistics on the discarded data usage. There is no another aggregate UPF network element between the aggregate UPF network element that collects statistics on the discarded data usage and an AN device. For other related descriptions, refer to the embodiment shown in FIG. 5. Details are not described herein again.

Figure 6A:
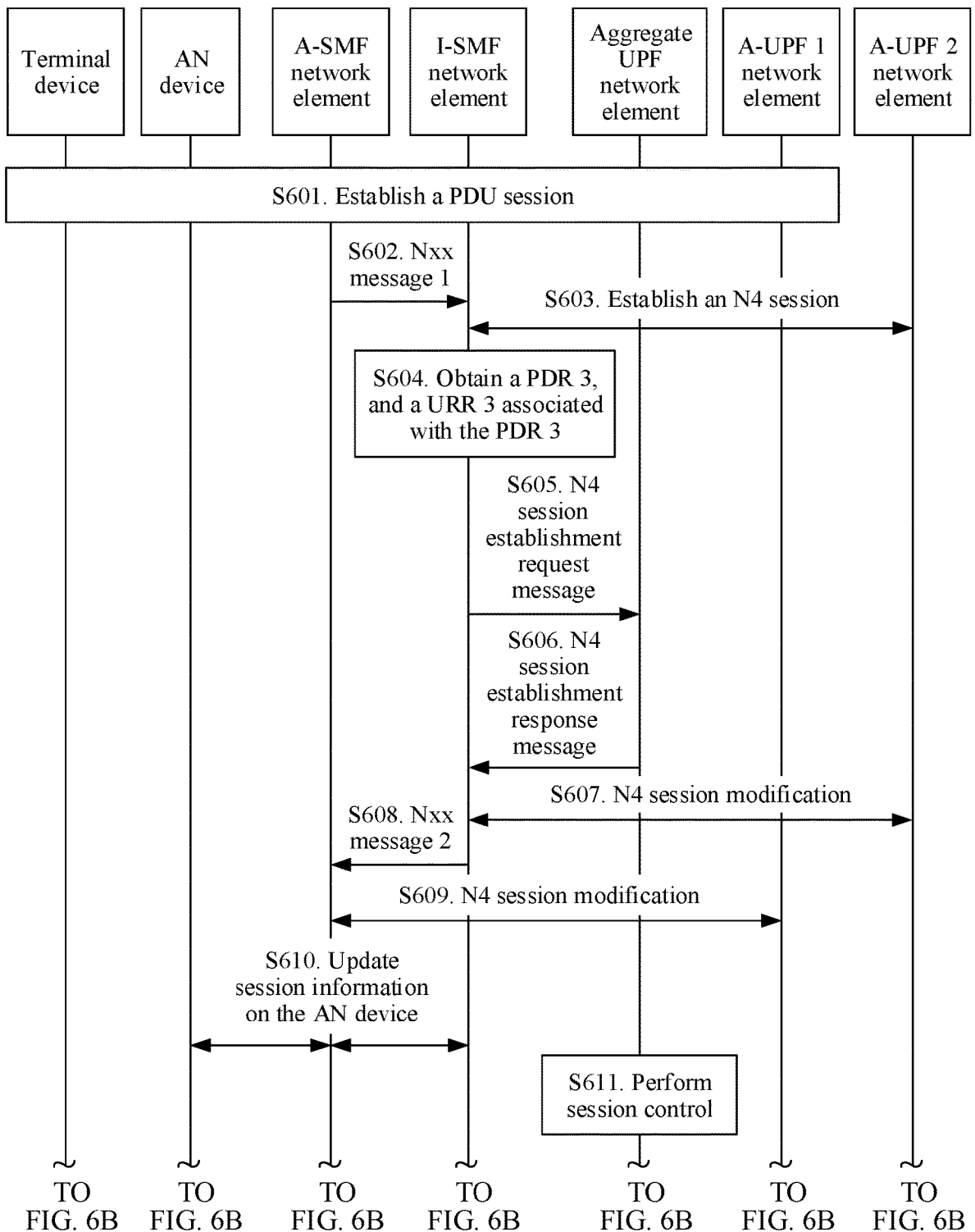
FIG. 6A and FIG. 6B are a schematic flowchart 2 of a method for collecting statistics on data usage according to an embodiment of this application.
Figure 6B:
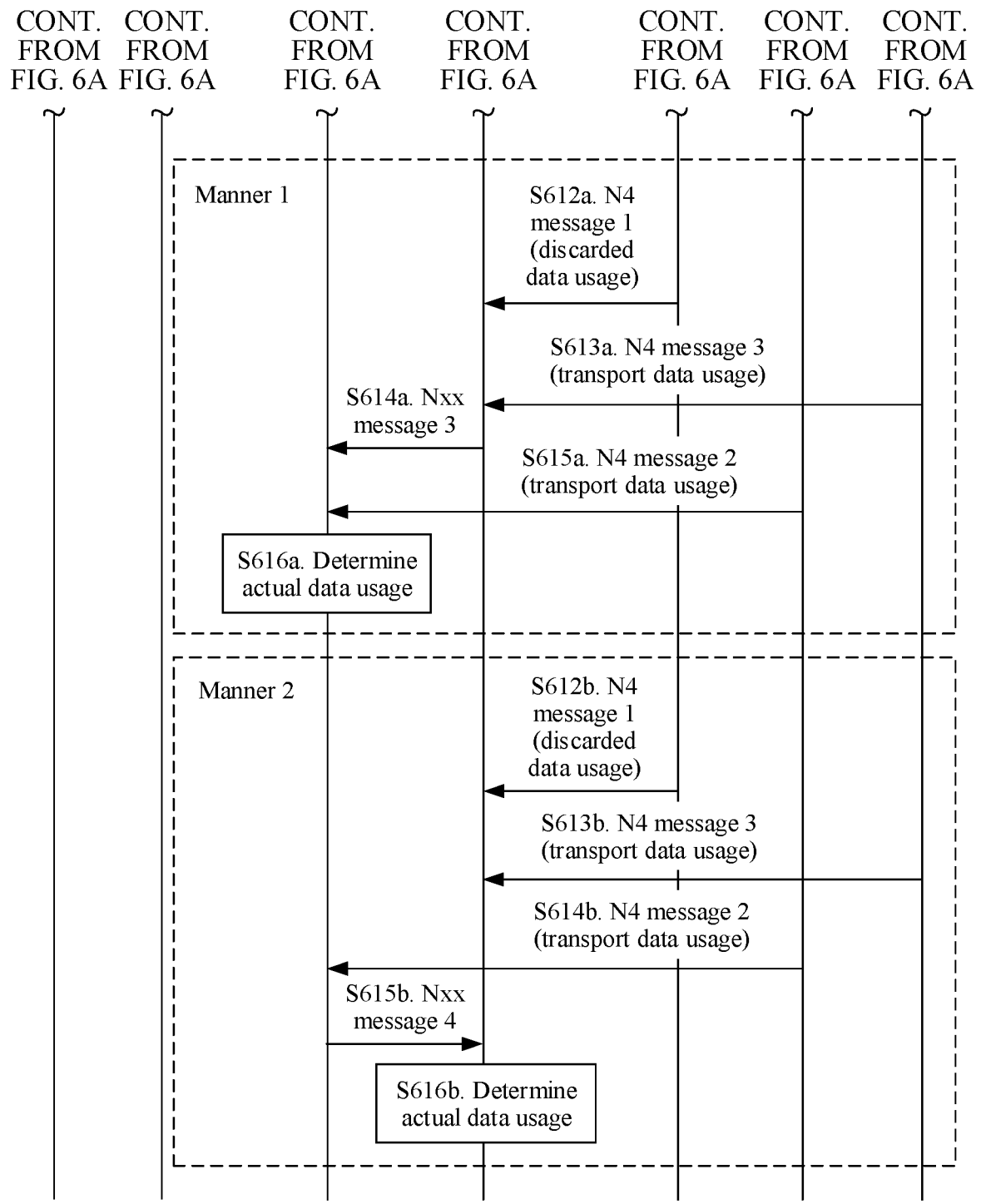

Alternatively, optionally, for example, the communications system shown in FIG. 1 is applied to the 5G network shown in FIG. 3. FIG. 6A and FIG. 6B show another method for collecting statistics on data usage according to an embodiment of this application, including the following steps.

S601. A terminal device establishes a PDU session, where an anchor of the PDU session is an A-UPF 1 network element.

For related descriptions of step S601, refer to step S501 in the embodiment shown in FIG. 5. Details are not described herein again.

S602. In a process in which an I-SMF network element is inserted into an A-UPF 2 network element, an A-SMF network element sends a message 6 to the I-SMF network element.

The I-SMF network element receives the message 6 from the A-SMF network element. The message 6 includes QFIs of one or more non-GBR QoS flows.

For example, as shown in FIG. 6A and FIG. 6B, the message 6, for example, may be an Nxx message 1.

S603. The I-SMF network element establishes an N4 session with the A-UPF 2 network element.

For related descriptions of step S603, refer to step S502 in the embodiment shown in FIG. 5. Details are not described herein again.

S604. The I-SMF network element obtains a PDR 3, and a URR 3 associated with the PDR 3.

Related descriptions of step S604 are similar to related descriptions of step S503 in the embodiment shown in FIG. 5. A difference, for example, lies in replacing the SMF network element in step S503 with the I-SMF network element in step S604. In addition, in step S604, that the I-SMF network element obtains a PDR 3 may specifically include: The I-SMF network element generates the PDR 3 based on the QFIs of the one or more non-GBR QoS flows that are received from the A-SMF network element. For other related descriptions, refer to the foregoing step S503. Details are not described herein again.

S605. The I-SMF network element sends a message 1 to an aggregate UPF network element. The aggregate UPF network element receives the message 1 from the I-SMF network element. The message 1 includes the PDR 3, and the URR 3 associated with the PDR 3.

Related descriptions of step S605 are similar to related descriptions of step S504 in the embodiment shown in FIG. 5. A difference, for example, lies in replacing the SMF network element in step S504 with the I-SMF network element in step S605. For other related descriptions, refer to the foregoing step S504. Details are not described herein again.

S606. The aggregate UPF network element sends a message 2 to the I-SMF network element. The I-SMF network element receives the message 2 from the aggregate UPF network element.

Related descriptions of step S606 are similar to related descriptions of step S505 in the embodiment shown in FIG. 5. A difference, for example, lies in replacing the SMF network element in step S505 with the I-SMF network element in step S606. For other related descriptions, refer to the foregoing step S505. Details are not described herein again.

S607. The I-SMF network element updates PDU session information of the A-UPF 2 network element by using an N4 session modification procedure.

Related descriptions of step S607 are similar to related descriptions of step S507 in the embodiment shown in FIG. 5. A difference, for example, lies in replacing the SMF network element in step S507 with the I-SMF network element in step S607. For other related descriptions, refer to the foregoing step S507. Details are not described herein again.

S608. The I-SMF network element sends a message 7 to the A-SMF network element. The A-SMF network element receives the message 7 from the I-SMF network element. The message 7 includes third tunnel information. The third tunnel information includes tunnel information required by the A-UPF 1 network element to send downlink data to the aggregate UPF network element.

For example, as shown in FIG. 6A and FIG. 6B, the message 7, for example, may be an Nxx message 2.

S609. The A-SMF network element updates PDU session information of the A-UPF 1 network element by using the N4 session modification procedure.

Related descriptions of step S609 are similar to related descriptions of step S506 in the embodiment shown in FIG. 5. A difference, for example, lies in replacing the SMF network element in step S506 with the A-SMF network element in step S609. For other related descriptions, refer to the foregoing step S506. Details are not described herein again.

S610. The I-SMF network element updates session information on an AN device.

Related descriptions of step S610 are similar to related descriptions of step S508 in the embodiment shown in FIG. 5. A difference, for example, lies in replacing the SMF network element in step S508 with the I-SMF network element in step S609. For other related descriptions, refer to the foregoing step S508. Details are not described herein again.

S611. In a data transmission process, the aggregate UPF network element performs session control.

For related descriptions of step S611, refer to step S509 in the embodiment shown in FIG. 5. Details are not described herein again.

The method for collecting statistics on data usage provided in this embodiment of this application is further described below in two possible implementations.

In a possible implementation, as shown in FIG. 6A and FIG. 6B, the method for collecting statistics on data usage provided in this embodiment of this application further includes the following steps S612a to S616a.

S612a. The aggregate UPF network element sends a message 3 to the I-SMF network element. The I-SMF network element receives the message 3 from the aggregate UPF network element. The message 3 includes discarded data usage of the aggregate UPF network element.

For example, as shown in FIG. 6A and FIG. 6B, the message 3, for example, may be an N4 message 1.

S613a. After collecting statistics on transport data usage based on a PDR 2 and a URR 2, the A-UPF 2 network element sends a message 5 to the I-SMF network element, and the I-SMF network element receives the message 5 from the A-UPF 2 network element. The message 5 includes the transport data usage of the A-UPF 2 network element.

For example, as shown in FIG. 6A and FIG. 6B, the message 5, for example, may be an N4 message 3.

S614a. The I-SMF network element sends a message 8 to the A-SMF network element. The A-SMF network element receives the message 8 from the I-SMF network element. The message 8 includes the transport data usage of the A-UPF 2 network element and the discarded data usage of the aggregate UPF network element.

For example, as shown in FIG. 6A and FIG. 6B, the message 8, for example, may be an Nxx message 3.

Optionally, in this embodiment of this application, the transport data usage of the A-UPF 2 network element and the discarded data usage of the aggregate UPF network element may alternatively be sent to the A-SMF network element by using different Nxx messages. For example, the I-SMF network element sends the transport data usage of the A-UPF 2 network element to the A-SMF network element by using an Nxx message. After receiving the transport data usage of the A-UPF 2 network element that is sent by the I-SMF network element, when the A-SMF network element requests the I-SMF network element for the discarded data usage of the aggregate UPF network element, the I-SMF network element sends the discarded data usage of the aggregate UPF network element to the A-SMF network element by using another Nxx message. This is not specifically limited in this embodiment of this application.

Optionally, in this embodiment of this application, the I-SMF network element may alternatively determine a piece of intermediate data usage based on the transport data usage of the A-UPF 2 network element and the discarded data usage of the aggregate UPF network element, and then send the intermediate data usage to the A-SMF network element. This is not specifically limited in this embodiment of this application. For example, the intermediate data usage=the transport data usage of the A-UPF 2 network element—the discarded data usage of the aggregate UPF network element.

S615a. After collecting statistics on the transport data usage based on the PDR 1 and the URR 1, the A-UPF 1 network element sends a message 4 to the A-SMF network element, and the A-SMF network element receives the message 4 from the A-UPF 1 network element. The message 4 includes the transport data usage of the A-UPF 1 network element.

For example, as shown in FIG. 6A and FIG. 6B, the message 4, for example, may be an N4 message 2.

Optionally, in this embodiment of this application, there is no necessary execution order among the steps S612a, S613a, and S615a. Any one of the steps may be performed first, and then other steps are performed. Alternatively, any two of the steps may be first performed simultaneously, and then the remaining step is performed. Alternatively, steps S612a, S613a, and S615a may be performed simultaneously. This is not specifically limited in this embodiment of this application.

S616a. The A-SMF network element determines actual data usage based on the transport data usage of the A-UPF 1 network element, the transport data usage of the A-UPF 2 network element, and the discarded data usage of the aggregate UPF network element.

For example, the actual data usage=(the transport data usage of the A-UPF 1 network element+the transport data usage of the A-UPF 2 network element)—the discarded data usage of the aggregate UPF network element.

Optionally, in this embodiment of this application, after obtaining the actual data usage of a terminal device, the A-SMF network element may further report the actual data usage to a PCF network element, so that the PCF network element collects statistics on charging and the like based on the actual data usage. This is not specifically limited in this embodiment of this application.

Alternatively, in another possible implementation, as shown in FIG. 6A and FIG. 6B, the method for collecting statistics on data usage provided in this embodiment of this application further includes the following steps S612b to S616b.

S612b to S613b are the same as the foregoing steps S612a to S613a. For related descriptions, refer to the foregoing steps S612a to S613a. Details are not described herein again.

S614b is the same as the foregoing step S615a. For related descriptions, refer to the foregoing step S615a. Details are not described herein again.

Optionally, in this embodiment of this application, there is no necessary execution order among the steps S612b, S613b, and S614b. Any one of the steps may be performed first, and then other steps are performed. Alternatively, any two of the steps may be first performed simultaneously, and then the remaining step is performed. Alternatively, steps S612b, S613b, and S614b may be performed simultaneously. This is not specifically limited in this embodiment of this application.

S615b. The A-SMF network element sends a message 9 to the I-SMF network element. The I-SMF network element receives the message 9 from the A-SMF network element. The message 9 includes the transport data usage of the A-UPF 1 network element.

For example, as shown in FIG. 6A and FIG. 6B, the message 9, for example, may be an Nxx message 4.

S616b. The I-SMF network element determines actual data usage based on the transport data usage of the A-UPF 1 network element, the transport data usage of the A-UPF 2 network element, and the discarded data usage of the aggregate UPF network element.

For example, the actual data usage=(the transport data usage of the A-UPF 1 network element+the transport data usage of the A-UPF 2 network element)—the discarded data usage of the aggregate UPF network element.

Optionally, in this embodiment of this application, after determining the actual data usage, the I-SMF network element may send the actual data usage to the A-SMF network element, and the A-SMF network element reports the actual data usage to the PCF network element, so that the PCF network element collects statistics on charging and the like based on the actual data usage. This is not specifically limited in this embodiment of this application.

At this point, execution of the method for collecting statistics on data usage provided in this embodiment of this application is completed.

Optionally, in this embodiment of this application, after the PDU session including the aggregate UPF network element is established, in a process in which the A-SMF network element establishes a new QoS flow or deletes an established QoS flow, if the QoS flow is a non-GBR QoS flow, the A-SMF network element sends updated PDR information to the I-SMF network element, so that the I-SMF network element sends the updated PDR information to the aggregate UPF. The updated PDR information, for example, may be used for deleting or adding a corresponding QFI. This is not specifically limited in this embodiment of this application. Alternatively, in a process in which the I-SMF network element determines to establish the new QoS flow or delete the established QoS flow, the I-SMF network element sends the updated PDR information to the aggregate UPF. The updated PDR information, for example, may be used for deleting or adding a corresponding QFI. This is not specifically limited in this embodiment of this application.

Based on the method for collecting statistics on data usage provided in this embodiment of this application, for a PDU session into which a UL CL UPF network element or a BP UPF network element is inserted, statistics can be accurately collected on data usage, to implement accurate charging.

The actions of the A-SMF network element or the aggregate UPF network element in the foregoing steps S601 to S616a or S616b may be performed by the processor 401 in the communications device 400 shown in FIG. 4 by invoking the application code stored in the memory 403. This is not limited in this embodiment.

Alternatively, optionally, using an example in which the communications system shown in FIG. 1 is applied to the 5G network shown in FIG. 2, the embodiments of this application may further provide a method for collecting statistics on data usage. The method for collecting statistics on data usage is similar to the embodiment shown in FIG. 5. A difference, for example, lies in that, in step S503 and step S504 of the embodiment shown in FIG. 5, the measurement method 3 in the URR 3 associated with the PDR 3 is collecting statistics on the discarded data usage. Therefore, in step S510 of the embodiment shown in FIG. 5, the aggregate UPF network element sends the discarded data usage of the aggregate UPF network element to the SMF network element, and further, in step S513 of the embodiment shown in FIG. 5, the SMF network element determines the actual data usage based on the transport data usage of the A-UPF 1 network element, the transport data usage of the A-UPF 2 network element, and the discarded data usage of the aggregate UPF network element. Different from the foregoing steps in the embodiment shown in FIG. 5, in this embodiment of this application, the measurement method 3 in the URR 3 associated with the PDR 3 is collecting statistics on the transport data usage. Therefore, the aggregate UPF network element sends the transport data usage of the aggregate UPF network element to the SMF network element. The transport data usage of the aggregate UPF network element is usage of data that is actually transmitted by the aggregate UPF network element and that is from data of the A-UPF 1 network element and the A-UPF 2 network element. Further, the SMF network element may determine the transport data usage of the aggregate UPF network element as the actual data usage of a terminal device. In addition, optionally, in this solution, when sending the PDR 3 and the URR 3 to the aggregate UPF network element, the SMF network element may send indication information for suspending statistics collection to the A-UPF 1 network element or delete the PDR 1 and the URR 1 on the A-UPF 1 network element, and send indication information for suspending statistics collection to the A-UPF 2 network element or delete the PDR 2 and the URR 2 on the A-UPF 2 network element. For other related descriptions, refer to the embodiment shown in FIG. 5. Details are not described herein again.

Alternatively, optionally, using an example in which the communications system shown in FIG. 1 is applied to the 5G network shown in FIG. 3, the embodiments of this application may further provide a method for collecting statistics on data usage. The method for collecting statistics on data usage is similar to the embodiment shown in FIG. 6A and FIG. 6B. A difference, for example, lies in that, in step S604 and step S605 of the embodiment shown in FIG. 6A and FIG. 6B, the measurement method 3 in the URR 3 associated with the PDR 3 is collecting statistics on the discarded data usage. Therefore, in step S612a or S612b of the embodiment shown in FIG. 6A and FIG. 6B, the aggregate UPF network element sends the discarded data usage of the aggregate UPF network element to the I-SMF network element, and further, in step S616a of the embodiment shown in FIG. 6A and FIG. 6B, the A-SMF network element determines the actual data usage based on the transport data usage of the A-UPF 1 network element, the transport data usage of the A-UPF 2 network element, and the discarded data usage of the aggregate UPF network element. Alternatively, in step S616b of the embodiment shown in FIG. 6A and FIG. 6B, the I-SMF network element determines the actual data usage based on the transport data usage of the A-UPF 1 network element, the transport data usage of the A-UPF 2 network element, and the discarded data usage of the aggregate UPF network element. Different from the foregoing steps in the embodiment shown in FIG. 6A and FIG. 6B, in this embodiment of this application, the measurement method 3 in the URR 3 associated with the PDR 3 is collecting statistics on the transport data usage. Therefore, the aggregate UPF network element sends the transport data usage of the aggregate UPF network element to the I-SMF network element. The transport data usage of the aggregate UPF network element is usage of data that is actually transmitted by the aggregate UPF network element and that is from data of the A-UPF 1 network element and the A-UPF 2 network element. Further, the I-SMF network element or the A-SMF network element may determine the transport data usage of the aggregate UPF network element as the actual data usage of a terminal device. In addition, optionally, in this solution, when sending the PDR 3 and the URR 3 to the aggregate UPF network element, the I-SMF network element may send indication information for suspending statistics collection to the A-UPF 2 network element or delete the PDR 2 and the URR 2 on the A-UPF 2 network element, and indicate the A-SMF network element to send indication information for suspending statistics collection to the A-UPF 1 network element or delete the PDR 1 and the URR 1 on the A-UPF 1 network element. For other related descriptions, refer to the embodiment shown in FIG. 6A and FIG. 6B. Details are not described herein again.

In addition, it should be noted that the foregoing embodiments of this application are all described by using an example in which the communications system shown in FIG. 1 is applied to a current non-roaming 5G network. Certainly, the method for collecting statistics on data usage provided in the embodiments of this application may also be applied to a 5G network in a roaming scenario, for example, a local grooming roaming 5G network architecture or a home routing roaming 5G network architecture. Alternatively, the method for collecting statistics on data usage provided in the embodiments of this application may also be applied to another future network. In this case, a corresponding method for collecting statistics on data usage is similar to the method in the foregoing embodiments, and only related network elements need to be adaptively replaced. Details are not described herein.

It may be understood that, in the foregoing embodiments, the methods and/or steps implemented by the aggregate user plane network element may alternatively be implemented by a component (for example, a chip or a circuit) that may be used in the aggregate user plane network element, and the methods and/or steps implemented by the first session management network element may alternatively be implemented by a component that may be used in the first session management network element.

The foregoing mainly describes the solutions provided in the embodiments of this application from a perspective of interaction between network elements. Correspondingly, the embodiments of this application further provide a communications apparatus. The communications apparatus is configured to implement the foregoing methods. The communications apparatus may be the first session management network element in the foregoing method embodiments, or an apparatus including the first session management network element, or a component that may be used in the first session management network element; or, the communications apparatus may be the aggregate user plane network element in the foregoing method embodiments, or an apparatus including the aggregate user plane network element, or a component that may be used in the aggregate user plane network element. It may be understood that, to implement the foregoing functions, the communications apparatus includes corresponding hardware structures and/or software modules for performing the functions. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed on the communications apparatus based on the foregoing method embodiments. For example, each function module may be obtained through division corresponding to each function, or two or more functions may be integrated into one processing module. The integrated module may be implemented in a form of hardware, or may be implemented in a form of a software functional module. It should be noted that, in this embodiment of this application, module division is an example, and is merely a logical function division. During actual implementation, another division manner may be used.

Figure 7:
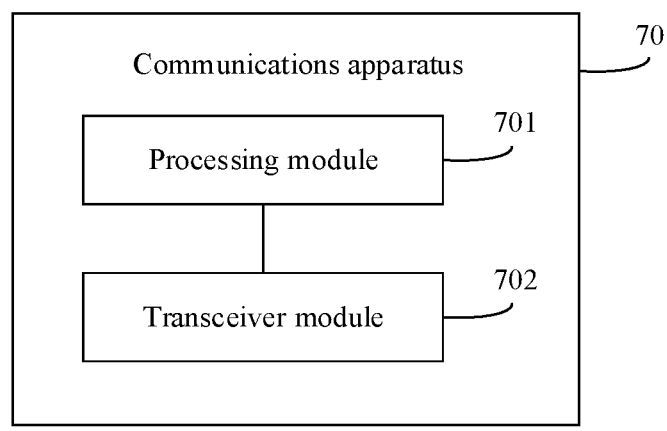
FIG. 7 is a schematic structural diagram of a communications apparatus according to an embodiment of this application.

For example, FIG. 7 is a schematic structural diagram of a communications apparatus 70. The communications apparatus 70 includes a processing module 701 and a transceiver module 702. The transceiver module 702 may also be referred to as a transceiver unit, configured to implement a sending and/or receiving function. For example, the transceiver module 702 may be a transceiver circuit, a receiver and transmitter, a transceiver, or a communications interface.

For example, the communications apparatus 70 is the first session management network element in the foregoing method embodiment.

The transceiver module 702 is configured to receive discarded data usage of an aggregate user plane network element. The transceiver module 702 is further configured to receive transport data usage of one or a plurality of anchor user plane network elements, where the one or plurality of anchor user plane network elements are anchor user plane network elements connected to the aggregate user plane network element. The processing module 701 is configured to determine actual data usage based on the discarded data usage and the transport data usage.

Optionally, the plurality of anchor user plane network elements include a first anchor user plane network element and a second anchor user plane network element. That the transceiver module 702 is configured to receive transport data usage of a plurality of anchor user plane network elements includes: The transceiver module 702 is configured to receive transport data usage of the first anchor user plane network element that is from the first anchor user plane network element; and the transceiver module 702 is configured to receive transport data usage of the second anchor user plane network element that is from the second anchor user plane network element.

Optionally, the plurality of anchor user plane network elements include a first anchor user plane network element and a second anchor user plane network element. That the transceiver module 702 is configured to receive transport data usage of a plurality of anchor user plane network elements includes: The transceiver module 702 is configured to receive transport data usage of the first anchor user plane network element that is from the first anchor user plane network element; and the transceiver module 702 is configured to receive transport data usage of the second anchor user plane network element that is from a second session management network element.

Optionally, the processing module 701 is further configured to obtain a first PDR and a URR, where the first PDR includes packet detection information, the URR includes a measurement method, the measurement method is collecting statistics on discarded data usage, and the first PDR is associated with the URR. The transceiver module 702 is further configured to send the first PDR and the URR to the aggregate user plane network element.

Optionally, the processing module 701 is further configured to obtain a second PDR and a QER, where the second PDR includes flow identifiers QFIs of one or more non-GBR QoS flows, the QER includes a session-AMBR, and the second PDR is associated with the QER. The transceiver module 702 is further configured to send the second PDR and the QER to the aggregate user plane network element.

Optionally, the transceiver module 702 is further configured to receive the QFIs of the one or more non-GBR QoS flows that are from the second session management network element. Correspondingly, that the processing module 701 is configured to obtain a second PDR includes: The processing module 701 is configured to generate the second PDR based on the QFIs of the one or more non-GBR QoS flows.

Optionally, the processing module 701 is further configured to obtain a second PDR, a QER, and a URR, where the second PDR includes QFIs of one or more non-GBR QoS flows, the QER includes a session-AMBR, the URR includes a measurement method, the measurement method is collecting statistics on discarded data usage, and the second PDR is associated with the URR and the QER. The transceiver module 702 is further configured to send the second PDR, the URR, and the QER to the aggregate user plane network element.

Alternatively, for example, the communications apparatus 70 is the aggregate user plane network element in the foregoing method embodiment.

The processing module 701 is configured to determine discarded data usage of an aggregate user plane network element. The transceiver module 702 is configured to send the discarded data usage to a session management network element, where the discarded data usage is used for determining actual data usage.

Optionally, the transceiver module 702 is further configured to receive a first PDR and a URR from the session management network element, where the first PDR includes packet detection information, the URR includes a measurement method, the measurement method is collecting statistics on discarded data usage, and the first PDR is associated with the URR. Correspondingly, that the processing module 701 is configured to determine discarded data usage of an aggregate user plane network element includes: The processing module 701 is configured to determine the discarded data usage of the aggregate user plane network element based on the first PDR and the URR.

Optionally, that the processing module 701 is configured to determine discarded data usage of an aggregate user plane network element includes: The processing module 701 is configured to determine the discarded data usage of the aggregate user plane network element based on a local policy.

Optionally, the transceiver module 702 is further configured to receive a second PDR and a QER from the session management network element, where the second PDR includes flow identifiers QFIs of one or more non-GBR QoS flows, the QER includes a session aggregate maximum bit rate session-AMBR, and the second PDR is associated with the QER. The processing module 701 is further configured to: match QFIs in received packets with the QFIs in the second PDR, and perform, based on the session-AMBR in the QER, bit rate control on a packet on which matching succeeds.

Optionally, the transceiver module 702 is further configured to receive a second PDR, a QER, and a URR from the session management network element, where the second PDR includes QFIs of one or more non-GBR QoS flows, the QER includes a session-AMBR, the URR includes a measurement method, the measurement method is collecting statistics on discarded data usage, and the second PDR is associated with the URR and the QER. The processing module 701 is further configured to: match QFIs in received packets with the QFIs in the second PDR, and perform, based on the session-AMBR in the QER, bit rate control on a packet on which matching succeeds. Correspondingly, that the processing module 701 is configured to determine discarded data usage of an aggregate user plane network element includes: The processing module 701 is configured to determine the discarded data usage of the aggregate user plane network element based on the URR.

Alternatively, for example, the communications apparatus 70 is the aggregate user plane network element in the foregoing method embodiment.

The processing module 701 is configured to determine transport data usage of the aggregate user plane network element. The aggregate user plane network element is a user plane network element connected to a plurality of anchor user plane network elements. The transport data usage is usage of data that is actually transmitted by the aggregate user plane network element and that is from data of the plurality of anchor user plane network elements. The transceiver module 702 is configured to send the transport data usage to the session management network element.

Optionally, the transceiver module 702 is further configured to receive a first PDR and a URR from the session management network element, where the first PDR includes packet detection information, the URR includes a measurement method, the measurement method is collecting statistics on transport data usage, and the first PDR is associated with the URR. Correspondingly, that the processing module 701 is configured to determine transport data usage of an aggregate user plane network element includes: The processing module 701 is configured to determine the transport data usage of the aggregate user plane network element based on the first PDR and the URR.

Optionally, that the processing module 701 is configured to determine transport data usage of an aggregate user plane network element includes: The processing module 701 is configured to determine the transport data usage of the aggregate user plane network element based on a local policy.

Optionally, the transceiver module 701 is further configured to receive a second PDR and a QER from the session management network element, where the second PDR includes flow identifiers QFIs of one or more non-GBR QoS flows, the QER includes a session-AMBR, and the second PDR is associated with the QER. The processing module 701 is configured to: match QFIs in received packets with the QFIs in the second PDR, and perform, based on the session-AMBR in the QER, bit rate control on a packet on which matching succeeds.

Optionally, the transceiver module 702 is further configured to receive a second PDR, a QER, and a URR from the session management network element, where the second PDR includes QFIs of one or more non-GBR QoS flows, the QER includes a session-AMBR, the URR includes a measurement method, the measurement method is collecting statistics on transport data usage, and the second PDR is associated with the URR and the QER. The processing module 702 is further configured to: match QFIs in received packets with the QFIs in the second PDR, and perform, based on the session-AMBR in the QER, bit rate control on a packet on which matching succeeds. Correspondingly, that the processing module 702 is configured to determine transport data usage of an aggregate user plane network element includes: The processing module 701 is configured to determine the transport data usage of the aggregate user plane network element based on the URR.

All related content of the steps in the foregoing method embodiments may be referenced to function descriptions of corresponding function modules, and details are not described herein again.

In this embodiment, the communications apparatus 70 is presented in a form of dividing each functional module in an integrated manner. The "module" herein may refer to a specific ASIC, a circuit, a processor that executes one or more software or firmware programs, a memory, an integrated logic circuit, and/or other devices that can provide the foregoing functions. In a simple embodiment, a person skilled in the art may conceive of that the communications apparatus 70 may be in a form of the communications device 400 shown in FIG. 4.

For example, the processor 401 in the communications device 400 shown in FIG. 4 may invoke the computer executable instructions stored in the memory 403, to enable the communications device 400 to perform the method for collecting statistics on data usage in the foregoing method embodiments.

Specifically, functions/implementation processes of the processing module 701 and the transceiver module 702 in FIG. 7 may be implemented by the processor 401 in the communications device 400 shown in FIG. 4 by invoking the computer executable instructions stored in the memory 403. Alternatively, the function/implementation process of the processing module 701 in FIG. 7 may be implemented by the processor 401 in the communications device 400 shown in FIG. 4 by invoking the computer executable instructions stored in the memory 403. The function/implementation process of the transceiver module 702 in FIG. 7 may be implemented by using the communications interface 404 in the communications device 400 shown in FIG. 4.

Because the communications apparatus 70 provided in this embodiment can perform the foregoing method for collecting statistics on data usage, for technical effects that can be obtained by the communications apparatus 70, refer to the foregoing method embodiments. Details are not described herein again.

It should be noted that one or more of the foregoing modules or units may be implemented by using software, hardware, or a combination thereof. When any one of the foregoing modules or units is implemented by using software, the software exists in a manner of computer program instructions and is stored in a memory. A processor may be configured to: execute the program instructions and implement the foregoing method procedure. The processor may be built into an SoC (system-on-a-chip) or an ASIC, or may be an independent semiconductor chip. In addition to a core configured to execute software instructions to perform an operation or processing, the processor may further include a necessary hardware accelerator, such as a field programmable gate array (FPGA), a PLD (programmable logic device), or a logic circuit that implements a dedicated logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, an SoC, an FPGA, a PLD, a dedicated digital circuit, a hardware accelerator, and a non-integrated discrete device, and the hardware may run necessary software or be independent of software to perform the foregoing method procedure.

Optionally, the embodiments of this application further provide a communications apparatus (for example, the communications apparatus may be a chip or a chip system). The communications apparatus includes a processor, configured to implement the method in any one of the foregoing method embodiments. In an embodiment, the communications apparatus further includes a memory. The memory is configured to store necessary program instructions and data. The processor may invoke program code stored in the memory, to indicate the communications apparatus to perform the method in any one of the foregoing method embodiments. Certainly, the memory may not be in the communications apparatus. When the communications apparatus is a chip system, the chip system may include a chip, or include a chip and other discrete devices. This is not specifically limited in this embodiment of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, definitely, various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. Definitely, a person skilled in the art can make various modifications and variations to this application without departing from the spirit and scope of this application. In this way, this application is intended to cover these modifications and variations of this application provided that they fall within the scope of the claims and equivalent technologies of this application.

What is claimed is:

1. A method for collecting statistics on data usage, wherein the method comprises:
    receiving, by a first session management network element, discarded data usage of an aggregate user plane network element;
    receiving, by the first session management network element, transport data usage of one or a plurality of anchor user plane network elements, wherein the one or the plurality of anchor user plane network elements are anchor user plane network elements connected to the aggregate user plane network element;
    determining, by the first session management network element, actual data usage based on the discarded data usage and the transport data usage;
    obtaining, by the first session management network element, a first packet detection rule (PDR) and a usage reporting rule (URR), wherein the first PDR comprises packet detection information, the URR comprises a measurement method, the measurement method is collecting statistics on the discarded data usage, and the first PDR is associated with the URR;
    obtaining, by the first session management network element, a second PDR and a quality of service (QOS) enforcement rule (QER), wherein the second PDR comprises flow identifiers (QFIs) of one or more non-guaranteed bit rate (non-GBR) QoS flows, the QER comprises a session aggregate maximum bit rate (session-AMBR), and the second PDR is associated with the QER; and
    sending, by the first session management network element, the first PDR, the URR, the second PDR, and the QER to the aggregate user plane network element.

2. The method according to claim 1, wherein the plurality of anchor user plane network elements comprise a first anchor user plane network element and a second anchor user plane network element; and
    the receiving, by the first session management network element, the transport data usage of the plurality of anchor user plane network elements comprises:
    receiving, by the first session management network element, transport data usage of the first anchor user plane network element that is from the first anchor user plane network element; and
    receiving, by the first session management network element, transport data usage of the second anchor user plane network element that is from the second anchor user plane network element.

3. The method according to claim 1, wherein the plurality of anchor user plane network elements comprise a first anchor user plane network element and a second anchor user plane network element; and
    the receiving, by the first session management network element, the transport data usage of the plurality of anchor user plane network elements comprises:
    receiving, by the first session management network element, transport data usage of the first anchor user plane network element that is from the first anchor user plane network element; and
    receiving, by the first session management network element, transport data usage of the second anchor user plane network element that is from a second session management network element.

4. The method according to claim 1, wherein the method further comprises:
    receiving, by the first session management network element, the QFIs of the one or more non-GBR QoS flows that are from a second session management network element; and
    correspondingly, the obtaining, by the first session management network element, the second PDR comprises:
    generating, by the first session management network element, the second PDR based on the QFIs of the one or more non-GBR QOS flows.

5. The method according to claim 1, wherein the method further comprises:
    obtaining, by the first session management network element, a third PDR, a second QER, and a second URR, wherein the third PDR comprises the QFIs of the one or more non-GBR QoS flows, the second QER comprises the session-AMBR, the second URR comprises the measurement method, the measurement method is collecting statistics on the discarded data usage, and the third PDR is associated with the second URR and the second QER; and
    sending, by the first session management network element, the third PDR, the second URR, and the second QER to the aggregate user plane network element.

6. A method for collecting statistics on data usage, wherein the method comprises:
    determining, by an aggregate user plane network element, discarded data usage of the aggregate user plane network element; and
    sending, by the aggregate user plane network element, the discarded data usage to a session management network element, wherein the discarded data usage is used for determining actual data usage,
    wherein before the determining, by the aggregate user plane network element, the discarded data usage of the aggregate user plane network element, the method further comprises:
    receiving, by the aggregate user plane network element, a first packet detection rule (PDR) and a usage reporting rule (URR) from the session management network element, wherein the first PDR comprises packet detection information, the URR comprises a measurement method, the measurement method is collecting statistics on the discarded data usage, and the first PDR is associated with the URR; and
    correspondingly, the determining, by the aggregate user plane network element, the discarded data usage of the aggregate user plane network element comprises:

determining, by the aggregate user plane network element, the discarded data usage of the aggregate user plane network element based on the first PDR and the URR, and wherein the method further comprises:

receiving, by the aggregate user plane network element, a second PDR and a quality of service (QoS) enforcement rule (QER) from the session management network element, wherein the second PDR comprises flow identifiers (QFIs) of one or more non-guaranteed bit rate (non-GBR) QoS flows, the QER comprises a session aggregate maximum bit rate (session-AMBR), and the second PDR is associated with the QER; and matching, by the aggregate user plane network element, QFIs in received packets with the QFIs in the second PDR, and performing, based on the session-AMBR in the QER, bit rate control on a packet on which matching succeeds.

7. The method according to claim 6, wherein the determining, by the aggregate user plane network element, the discarded data usage of the aggregate user plane network element comprises:

determining, by the aggregate user plane network element, the discarded data usage of the aggregate user plane network element based on a local policy.

8. The method according to claim 6, wherein the method further comprises:

receiving, by the aggregate user plane network element, a third PDR, a second QER, and a second URR from the session management network element, wherein the third PDR comprises the QFIs of the one or more non-GBR QoS flows, the second QER comprises the session-AMBR, the second URR comprises the measurement method, the measurement method is collecting statistics on the discarded data usage, and the third PDR is associated with the second URR and the second QER; and matching, by the aggregate user plane network element, QFIs in received packets with the QFIs in the third PDR, and performing, based on the session-AMBR in the second QER, bit rate control on a packet on which matching succeeds; and correspondingly, the determining, by the aggregate user plane network element, the discarded data usage of the aggregate user plane network element comprises:

determining, by the aggregate user plane network element, the discarded data usage of the aggregate user plane network element based on the second URR.

9. A communications apparatus, wherein the communications apparatus comprises a processor and a transceiver;

the transceiver is configured to receive discarded data usage of an aggregate user plane network element;

the transceiver is further configured to receive transport data usage of one or a plurality of anchor user plane network elements, wherein the one or the plurality of anchor user plane network elements are anchor user plane network elements connected to the aggregate user plane network element;

the processor is configured to determine actual data usage based on the discarded data usage and the transport data usage;

the processor is further configured to obtain a first packet detection rule (PDR) and a usage reporting rule (URR), wherein the first PDR comprises packet detection information, the URR comprises a measurement method, the measurement method is collecting statistics on the discarded data usage, and the first PDR is associated with the URR;

the processor is further configured to obtain a second PDR and a quality of service (QoS) enforcement rule (QER), wherein the second PDR comprises flow identifiers (QFIs) of one or more non-guaranteed bit rate (non-GBR) QoS flows, the QER comprises a session aggregate maximum bit rate (session-AMBR), and the second PDR is associated with the QER; and the transceiver is further configured to send the first PDR, the URR, the second PDR, and the QER to the aggregate user plane network element.

10. The communications apparatus according to claim 9, wherein the plurality of anchor user plane network elements comprise a first anchor user plane network element and a second anchor user plane network element; and that the transceiver is configured to receive the transport data usage of the plurality of anchor user plane network elements comprises:

the transceiver is configured to receive transport data usage of the first anchor user plane network element that is from the first anchor user plane network element; and the transceiver is configured to receive transport data usage of the second anchor user plane network element that is from the second anchor user plane network element.

11. The communications apparatus according to claim 9, wherein the plurality of anchor user plane network elements comprise a first anchor user plane network element and a second anchor user plane network element; and that the transceiver is configured to receive the transport data usage of the plurality of anchor user plane network elements comprises:

the transceiver is configured to receive transport data usage of the first anchor user plane network element that is from the first anchor user plane network element; and the transceiver is configured to receive transport data usage of the second anchor user plane network element that is from a second session management network element.

12. The communications apparatus according to claim 9, wherein the transceiver is further configured to receive the QFIs of the one or more non-GBR QoS flows that are from a second session management network element; and correspondingly, that the processor is further configured to obtain the second PDR comprises:

the processor is configured to generate the second PDR based on the QFIs of the one or more non-GBR QoS flows.

13. The communications apparatus according to claim 9, wherein the processor is further configured to obtain a third PDR, a second QER, and a second URR, wherein the third PDR comprises the QFIs of the one or more non-GBR QoS flows, the second QER comprises the session-AMBR, the second URR comprises the measurement method, the measurement method is collecting statistics on the discarded data usage, and the third PDR is associated with the second URR and the second QER; and the transceiver is further configured to send the third PDR, the second URR, and the second QER to the aggregate user plane network element.

\* \* \* \* \*

UNITED STATES PATENT AND TRADEMARK OFFICE
CERTIFICATE OF CORRECTION

| | | |
|---|---|---|
| PATENT NO. | : 12,089,087 B2 | Page 1 of 1 |
| APPLICATION NO. | : 17/375671 | |
| DATED | : September 10, 2024 | |
| INVENTOR(S) | : Yizhuang Wu | |

It is certified that error appears in the above-identified patent and that said Letters Patent is hereby corrected as shown below:

In the Claims

Claim 1: Column 33, Line 43: "ment, a second PDR and a quality of service (QOS)" should read as -- ment, a second PDR and a quality of service (QoS) --.

Claim 4: Column 34, Line 27: "or more non-GBR QOS flows." should read as -- or more non-GBR QoS flows. --.

Signed and Sealed this
Thirteenth Day of May, 2025

Coke Morgan Stewart
*Acting Director of the United States Patent and Trademark Office*